(12) United States Patent
Nakamura et al.

(10) Patent No.: US 12,179,306 B2
(45) Date of Patent: Dec. 31, 2024

(54) PALLET TRANSFER SYSTEM, PALLET TRANSFER METHOD, AND PALLET TRANSFER PROGRAM

(71) Applicant: DMG MORI CO., LTD., Yamatokoriyama (JP)

(72) Inventors: Takayuki Nakamura, Yamatokoriyama (JP); Hideaki Yoshioka, Yamatokoriyama (JP); Xinwei Sun, Yamatokoriyama (JP); Junya Nagata, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 839 days.

(21) Appl. No.: 17/423,278

(22) PCT Filed: Aug. 7, 2019

(86) PCT No.: PCT/JP2019/031039
§ 371 (c)(1),
(2) Date: Jul. 15, 2021

(87) PCT Pub. No.: WO2020/152892
PCT Pub. Date: Jul. 30, 2020

(65) Prior Publication Data
US 2022/0072669 A1    Mar. 10, 2022

(30) Foreign Application Priority Data
Jan. 25, 2019 (JP) ................................. 2019-011173

(51) Int. Cl.
*B23Q 7/12* (2006.01)
*B23Q 41/02* (2006.01)

(52) U.S. Cl.
CPC ............... *B23Q 7/12* (2013.01); *B23Q 41/02* (2013.01)

(58) Field of Classification Search
CPC .................................. B23Q 7/12; B23Q 41/02
See application file for complete search history.

(56) References Cited

U.S. PATENT DOCUMENTS 3,909,922 A    10/1975  Takasaki et al.
4,160,937 A *  7/1979   Fiorini ................... B23Q 15/12
                                                    318/634
(Continued)

FOREIGN PATENT DOCUMENTS

| CN | 1545053 A | 11/2004 |
| EP | 2 839 923 A1 | 2/2015 |
| JP | 9-174371 A | 7/1997 |

OTHER PUBLICATIONS

International Search Report issued on Nov. 5, 2019 in PCT/JP2019/031039 filed on Aug. 7, 2019.

*Primary Examiner* — Kyle O Logan
(74) *Attorney, Agent, or Firm* — Oblon, McClelland, Maier & Neustadt, L.L.P.

(57) ABSTRACT

A technology that can prevent leakage of confidential workpiece information in a course of workpiece transfer is provided. A pallet transfer system includes a transfer device, a pallet storage, a work station, a machine tool, and a control device. The control device determines whether or not the workpiece is a confidential target based on information indicating whether or not the workpiece to be machined is a confidential target, the control device transfers the pallet to which the workpiece is attached by a first transfer method when determining that the workpiece is not the confidential target, and the control device transfers the pallet to which the workpiece is attached by a second transfer method different from the first transfer method when determining that the workpiece is the confidential target.

11 Claims, 17 Drawing Sheets

(56) References Cited

U.S. PATENT DOCUMENTS

| | | | | |
|---|---|---|---|---|
| 5,920,480 | A * | 7/1999 | Nakamura | B23Q 41/08 |
| | | | | 700/114 |
| 6,052,627 | A * | 4/2000 | Nakamura | B23Q 7/1426 |
| | | | | 700/182 |
| 7,550,681 | B2 * | 6/2009 | Wang | G01G 7/00 |
| | | | | 177/1 |
| 7,845,483 | B2 * | 12/2010 | Noguchi | B23P 21/004 |
| | | | | 198/346.3 |
| 2004/0019394 | A1 * | 1/2004 | Red | G05B 19/4097 |
| | | | | 700/19 |
| 2006/0208893 | A1 * | 9/2006 | Anson | G08B 13/1472 |
| | | | | 700/215 |
| 2008/0267749 | A1 * | 10/2008 | Kiriyama | B23Q 7/1431 |
| | | | | 29/33 P |
| 2010/0089719 | A1 * | 4/2010 | Finkenwirth | B23Q 7/1431 |
| | | | | 198/339.1 |
| 2011/0100783 | A1 * | 5/2011 | Baba | B65G 35/06 |
| | | | | 198/606 |
| 2012/0255833 | A1 * | 10/2012 | Ryu | B23Q 1/262 |
| | | | | 198/465.1 |
| 2012/0290126 | A1 * | 11/2012 | Combs | G05B 19/4189 |
| | | | | 198/781.01 |
| 2013/0251482 | A1 * | 9/2013 | Issing | B65G 1/06 |
| | | | | 414/800 |
| 2013/0302128 | A1 * | 11/2013 | Miyazaki | B23Q 3/186 |
| | | | | 29/33 P |
| 2015/0266151 | A1 * | 9/2015 | Komatsu | B23Q 3/15713 |
| | | | | 483/1 |
| 2015/0298272 | A1 * | 10/2015 | Murata | B23Q 11/0891 |
| | | | | 414/222.07 |
| 2016/0263718 | A1 * | 9/2016 | Miyazaki | B23Q 7/1431 |
| 2018/0312349 | A1 * | 11/2018 | Morfino | B65G 1/0407 |

\* cited by examiner

FIG.11

SETTING SCREEN — 130

<SETTING OF CONFIDENTIAL AREA> — 131

| WORKPIECE TYPE | CONFIDENTIAL TARGET |
|---|---|
| WORKPIECE A | YES ▶ |
| WORKPIECE B | NO ▶ |
| WORKPIECE C | YES ▶ |
| WORKPIECE D | NO ▶ |
| ⋯ | ⋯ |

<TRANSFER PROHIBITION TIME PERIOD>

| START TIME | 8:00 |
|---|---|
| END TIME | 18:00 |

— 135

<SETTING OF CONFIDENTIAL AREA> — 132

| MACHINE TOOL | CONFIDENTIAL AREA |
|---|---|
| M1 | YES ▶ |
| M2 | NO ▶ |
| ⋯ | ⋯ |

— 133

| PALLET STORAGE | CONFIDENTIAL AREA |
|---|---|
| A1 | YES ▶ |
| A2 | NO ▶ |
| ⋯ | ⋯ |

— 134

| WORK STATION | CONFIDENTIAL AREA |
|---|---|
| S1 | YES ▶ |
| S2 | NO ▶ |
| ⋯ | ⋯ |

[ OK ] — 136      [ CANCEL ] — 137

PALLET TRANSFER SYSTEM, PALLET TRANSFER METHOD, AND PALLET TRANSFER PROGRAM

TECHNICAL FIELD

The present disclosure relates to pallet transfer control in a pallet transfer system.

BACKGROUND ART

A pallet transfer system capable of sequentially processing a large number of workpieces according to a preset schedule is known. Regarding the pallet transfer system, PTL 1 (Japanese Patent Laying-Open No. 09-174371) discloses "a pallet pool type machining device that can improve the flexibility and expandability in design and manufacturing and reduce cost when a device is newly constructed according to a user's request, when a device adds or expands, or when arrangement is changed".

CITATION LIST

Patent Literature

PTL 1: Japanese Patent Laying-Open No. 09-174371

SUMMARY OF INVENTION

Technical Problem

The pallet transfer system includes a work station, a machine tool, a pallet storage, and the like. A worker attaches the workpiece to be machined to a pallet at the work station. When the work of attaching the workpiece is completed, the pallet is transferred to the machine tool, and the machining of the workpiece is started. When the machining of the workpiece is completed, the pallet on which the pallet is loaded is transferred to the pallet storage or the work station.

In this way, the workpiece is transferred to various locations in a transfer course. Depending on a type of the workpiece, only a person having special authority can disclose a machining course and a shape after the machining. For this reason, when the workpiece is randomly transferred to the pallet transfer system, confidential information of the workpiece may be disclosed to an unauthorized person.

The present disclosure has been made to solve the above-mentioned problems, and an object of the present disclosure is to provide a pallet transfer system capable of preventing leakage of confidential workpiece information in a course of the workpiece transfer. An object in another aspect is to provide a pallet transfer method capable of preventing leakage of confidential workpiece information in a course of the workpiece transfer. An object in still another aspect is to provide a pallet transfer program capable of preventing leakage of confidential workpiece information in the course of the workpiece transfer.

Solution to Problem

In one example of the present disclosure, a pallet transfer system includes: a transfer device configured to transfer a pallet to which a workpiece can be attached to which a workpiece is attachable; a pallet storage that is one of pallet transfer destinations by the transfer device and configured to store a plurality of pallets; a work station that is one of the pallet transfer destinations by the transfer device, where a worker performs work of attaching the workpiece to the pallet transferred from the pallet storage; a machine tool that is one of the pallet transfer destinations by the transfer device and configured to machine the workpiece attached to the pallet at the work station; and a control device configured to control the transfer device. The control device determines whether or not the workpiece to be machined is a confidential target based on information indicating whether or not the workpiece is a confidential target, the control device transfers the pallet to which the workpiece to be machined is attached by the first transfer method when determining that the workpiece to be machined is not the confidential target, and the control device transfers the pallet to which the workpiece to be machined is attached by a second transfer method different from the first transfer method when determining that the workpiece to be machined is the confidential target.

In one example of the present disclosure, the control device changes a transfer path of the pallet to which the workpiece to be machined is attached between the first transfer method and the second transfer method.

In one example of the present disclosure, the pallet transfer system includes a plurality of the machine tools. In the first transfer method, the pallet to which the workpiece to be machined is attached is transferred to an unoccupied machine tool in the plurality of machine tools. In the second transfer method, the pallet is transferred to a predetermined machine tool in the plurality of machine tools.

In one example of the present disclosure, the pallet to which the workpiece to be machined is attached is transferred to an unoccupied location in the pallet storage in the first transfer method. In the second transfer method, the pallet is transferred to a predetermined location in the pallet storage.

In one example of the present disclosure, the pallet transfer system includes a plurality of the work stations. In the first transfer method, the pallet to which the workpiece to be machined is attached is transferred to an unoccupied work station in the plurality of work stations. In the second transfer method, the pallet is transferred to a predetermined work station in the plurality of work stations.

In one example of the present disclosure, in the second transfer method, the transfer of the pallet to which the workpiece of the confidential target is attached is prohibited in a predetermined time period.

In one example of the present disclosure, the work station includes a display that displays information about the workpiece to be machined and a display control part that controls displaying of the display. The display control part permits displaying, on the display, information about the workpiece of the confidential target when the workpiece to be machined is a confidential target while predetermined first authority is given to the worker, and the display control part restricts the displaying of the information about the workpiece of the confidential target when the workpiece to be machined is a confidential target while second authority lower than the first authority is given to the worker.

Another example of the present disclosure provides a pallet transfer method in a pallet transfer system. The pallet transfer system includes: a transfer device that transfers a pallet to which a workpiece is attachable; a pallet storage that is one of pallet transfer destinations by the transfer device and stores a plurality of pallets; a work station that is one of the pallet transfer destinations by the transfer device, where a worker performs work of attaching the workpiece to the pallet transferred from the pallet storage; and a machine tool that is one of the pallet transfer destinations by the transfer device and machines the workpiece attached to the pallet at the work station. The pallet transfer method includes: determining whether or not the workpiece to be machined is a confidential target based on information indicating whether or not the workpiece is a confidential target; transferring the pallet to which the workpiece to be machined is attached by the first transfer method when determining that the workpiece to be machined is not the confidential target; and transferring the pallet to which the workpiece to be machined is attached by a second transfer method different from the first transfer method when determining that the workpiece to be machined is the confidential target.

Another example of the present disclosure provides a pallet transfer program executed by a pallet transfer system. The pallet transfer system includes: a transfer device that transfers a pallet to which a workpiece is attachable; a pallet storage that is one of pallet transfer destinations by the transfer device and stores a plurality of pallets; a work station that is one of the pallet transfer destinations by the transfer device, where a worker performs work of attaching the workpiece to the pallet transferred from the pallet storage; and a machine tool that is one of the pallet transfer destinations by the transfer device and machines the workpiece attached to the pallet at the work station. The pallet transfer program causes the pallet transfer system to execute: determining whether or not the workpiece to be machined is a confidential target based on information indicating whether or not the workpiece is a confidential target; transferring the pallet to which the workpiece to be machined is attached by the first transfer method when determining that the workpiece to be machined is not the confidential target; and transferring the pallet to which the workpiece to be machined is attached by a second transfer method different from the first transfer method when determining that the workpiece to be machined is the confidential target.

Advantageous Effects of Invention

In a certain aspect, the confidential information of the workpiece can be prevented from being leaked in a course of the workpiece transfer.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 11 is a view illustrating an example of a confidential setting screen.

DESCRIPTION OF EMBODIMENTS

Figure 1:
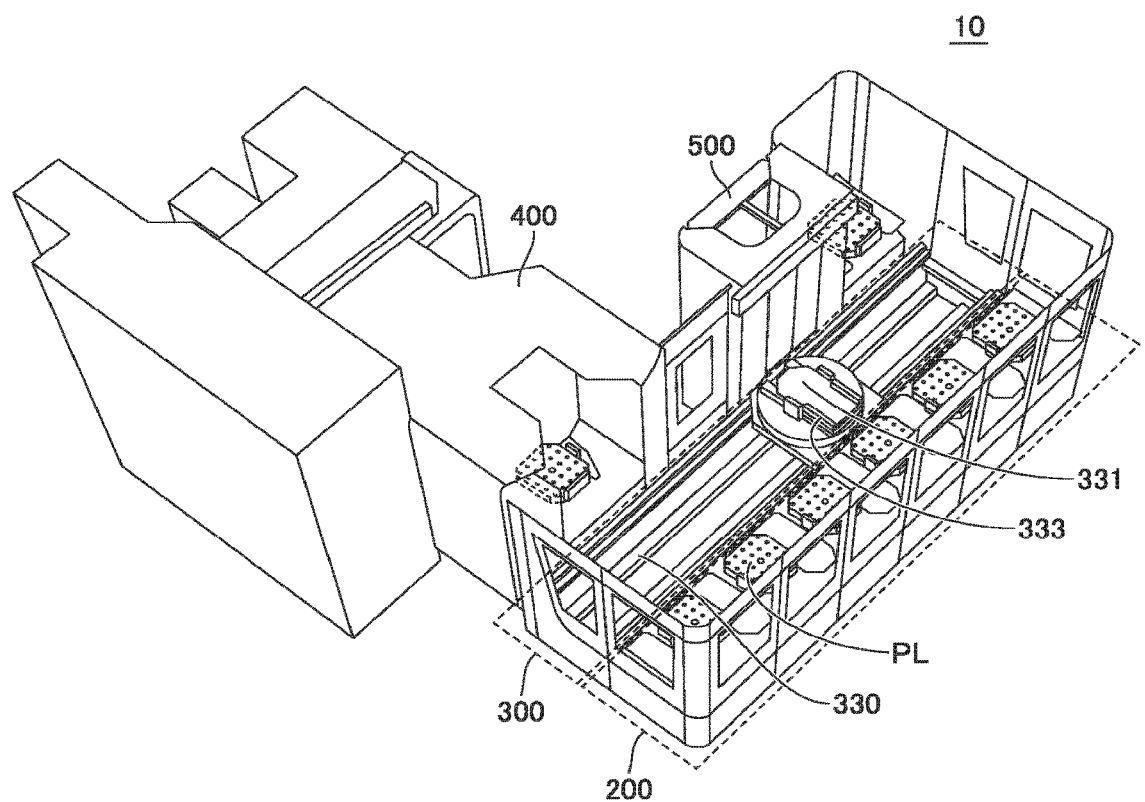
FIG. 1 is a view illustrating an appearance of a pallet transfer system.

Hereinafter, an embodiment of the present invention will be described with reference to the drawings. In the following description, the same parts and components are denoted by the same reference numeral. Their names and functions are the same. Thus, the detailed description thereof will not be repeated. The following embodiments and modifications described below may selectively be combined as appropriate.

<A. Appearance of Pallet Transfer System 10>

With reference to FIG. 1, a pallet transfer system 10 will be described. FIG. 1 is a view illustrating an appearance of pallet transfer system 10.

As illustrated in FIG. 1, pallet transfer system 10 includes at least one pallet storage 200, at least one transfer device 300, at least one machine tool 400, and at least one work station 500.

Pallet storage 200 is one of transfer destinations of a pallet PL by transfer device 300, and is a location that stores pallet PL. A plurality of pallets PL can be stored in pallet storage 200. Pallet storage 200 stores an empty pallet on which a workpiece is not loaded, a pallet on which a workpiece before machining is loaded, a pallet on which a workpiece during machining is loaded, a pallet on which a machined workpiece is loaded, and the like.

Transfer device 300 transfers designated pallet PL to a designated location. More specifically, transfer device 300 includes a rail 330 and a carriage 331. For example, carriage 331 is configured to be movable along rail 330 by a servomotor 335 (see FIG. 2) described later. Carriage 331 has a fork part 333 configured to be drivable in a direction orthogonal to rail 330 (that is, a direction orthogonal to a traveling direction of carriage 331). Carriage 331 moves along rail 330 to a position of pallet PL to be transferred, and the pallet PL to be transferred is placed on carriage 331 using fork part 333. Then, carriage 331 moves along rail 330 to the designated destination, and pallet PL to be transferred is carried into the transfer destination using fork part 333.

Machine tool 400 is one of the transfer destinations of pallet PL by the transfer device 300. Machine tool 400 machines the workpiece attached to pallet PL carried in according to a pre-designed machining program. When the machining of the workpiece is completed, pallet PL in machine tool 400 is transferred to pallet storage 200 or work station 500 by transfer device 300.

Work station 500 is one of transfer destinations of pallet PL by transfer device 300. At work station 500, the worker performs various works on carried-in pallet PL. As an example, at work station 500, the worker performs the work of attaching the workpiece to be machined to the carried-in pallet PL, the work of removing the machined workpiece from pallet PL, and the like. When the work on pallet PL is completed, the worker performs an operation for instructing work completion. Based on this, transfer device 300 transfers pallet PL in work station 500 to pallet storage 200 or machine tool 400.

<B. Device Configuration of Pallet Transfer System 10>

Figure 2:
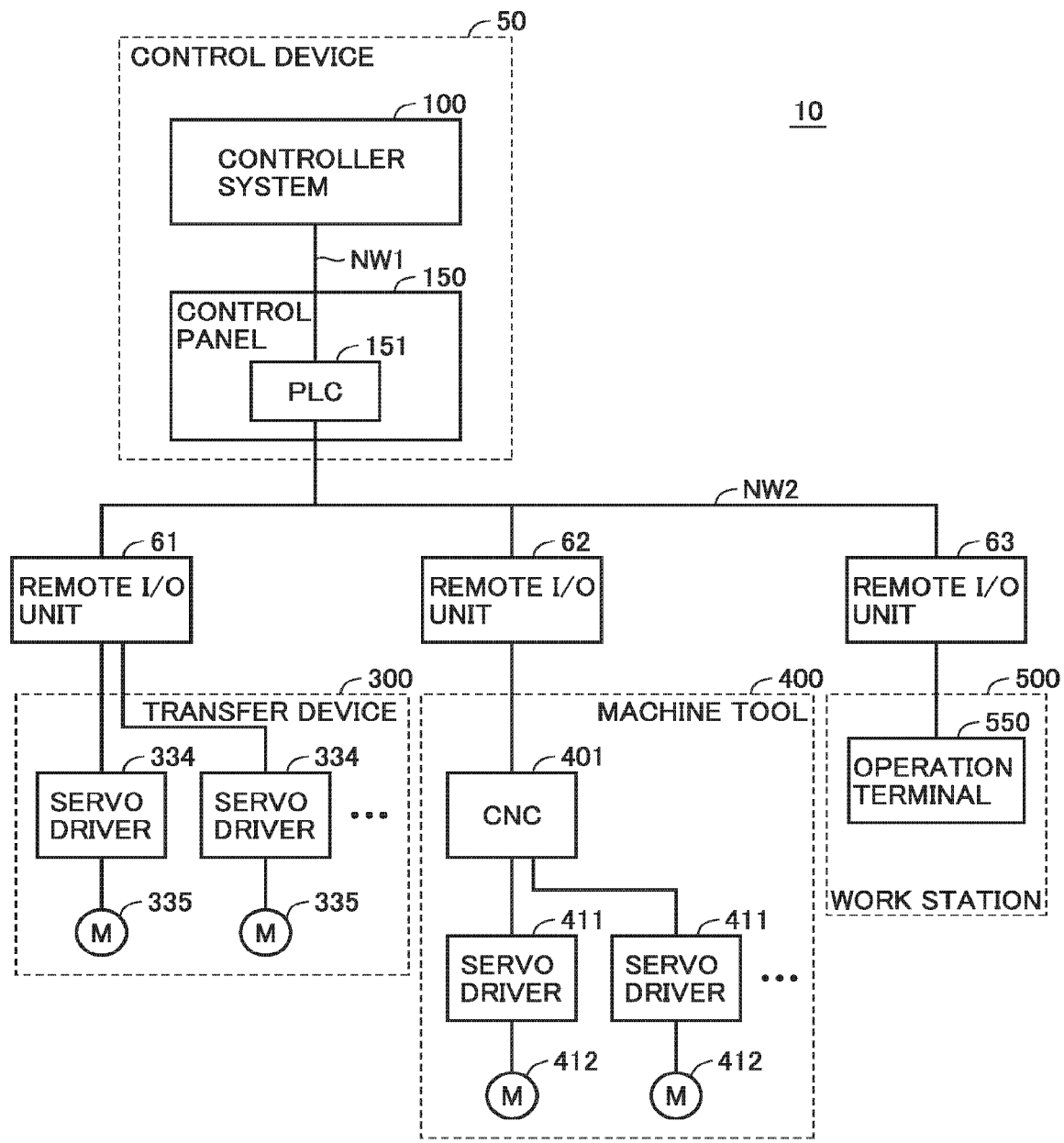
FIG. 2 is a view illustrating an example of a device configuration of the pallet transfer system.

FIG. 2 is a view illustrating an example of a device configuration of pallet transfer system 10. With reference to FIG. 2, an example of the device configuration of pallet transfer system 10 will be described As illustrated in FIG. 2, pallet transfer system 10 includes a control device 50, remote I/O (Input/Output) units 61 to 63, transfer device 300, machine tool 400, and work station 500.

"Control device 50" as used herein means a device that controls pallet transfer system 10. The device configuration of control device 50 is arbitrary. Control device 50 may be constructed with a single control unit or a plurality of control units. In the example of FIG. 2, control device 50 includes a control system 100 and a control panel 150.

Control system 100 is a main computer that controls pallet transfer system 10. Control panel 150 controls various industrial devices that automate the machining process. Control panel 150 includes a PLC 151.

Control system 100 and PLC 151 are connected to a network NW1. Control system 100 and PLC 151 may be connected by wire or wireless. EtherNET™ and the like will be adopted for network NW1. Control system 100 transmits a control command to PLC 151 through network NW1. The control command specifies pallet PL to be transferred, the transfer destination of pallet PL, the transfer start/stop of pallet PL, and the like.

Remote I/O units 61 to 63 and PLC 151 are connected to a network NW2. Preferably a field network that performs fixed-period communication guaranteeing a data arrival time is used as network NW2. EtherCAT™, EtherNet/IP™, CC-Link™, CompoNet (registered trademark), and the like are adopted as the field network that performs the fixed-period communication.

Transfer device 300 includes at least one servo driver 334 and at least one servomotor 335. Remote I/O unit 61 is installed in or around transfer device 300. Remote I/O unit 61 mediates data exchange between various drive units (for example, servo driver 334) in transfer device 300 and PLC 151. Servo driver 334 receives a control command from PLC 151 through remote I/O unit 61 at regular intervals, and drives and controls servomotor 335 according to the control command. As an example, one servomotor 335 drives and controls carriage 331 (see FIG. 1), and another servomotor 335 drives and controls above-mentioned fork part 333 (see FIG. 1).

Servo driver 334 sequentially receives an input of a target rotation speed (or a target position) from PLC 151, and controls servomotor 335 such that servomotor 335 rotates at the target rotation speed. More specifically, servo driver 334 calculates an actual rotation speed (or an actual position) of servomotor 335 from a feedback signal of an encoder (not illustrated) for servomotor 335, increases the rotation speed of servomotor 335 when the actual rotation speed is smaller than the target rotation speed, and decreases the rotation speed of servomotor 335 when the actual rotation speed is larger than the target rotation speed. In this manner, servo driver 334 brings the rotation speed of servomotor 335 closer to the target rotation speed while sequentially receiving feedback of the rotation speed of servomotor 335. As a result, transfer device 300 can move pallet PL to any transfer destination.

Machine tool 400 includes a CNC (Computer Numerical Control) 401, a servo driver 411, and a servomotor 412. Remote I/O unit 62 is installed in or around machine tool 400. Remote I/O unit 62 mediates the data exchange between various drive units (for example, CNC 401) in machine tool 400 and PLC 151. Similarly to servo driver 334, servo driver 411 receives a control command from PLC 151 through remote I/O unit 62 at regular intervals, and drives and controls servomotor 412 according to the control command.

Work station 500 includes an operation terminal 550 that accepts an operation of the worker. Remote I/O unit 63 is installed in or around work station 500. Remote I/O unit 63 mediates exchange of data between operation terminal 550 and PLC 151. An operator's operation content for operation terminal 550 is sent to PLC 151 through remote I/O unit 63 at regular intervals.

<C. Pallet Transfer Process>

Control device 50 of control system 100 transfers the workpiece to various locations such as pallet storage 200, transfer device 300, and machine tool 400. At this point, depending on a type of the workpiece, only a person having special authority can disclose a machining course and a shape after the machining.

For this reason, control device 50 changes the method for transferring the workpiece depending on whether or not the workpiece to be machined is a confidential target. More specifically, control device 50 determines whether or not the workpiece to be machined is the confidential target based on information indicating whether or not the workpiece is the confidential target. When determining that the workpiece to be machined is not the confidential target, control device 50 transfers the pallet to which the workpiece is attached by a normal transfer method (first transfer method). On the other hand, when determining that the workpiece to be machined is the confidential target, control device 50 uses a special transfer method (second transfer method) different from the normal transfer method for the pallet to which the workpiece is attached. In this manner, by changing the transfer method between the workpiece of the confidential target and the workpiece of a non-confidential target, confidential information of the workpiece can be prevented from being leaked in the course of the workpiece transfer.

In the following description, for convenience of explanation, the workpiece of a confidential target is referred to as a "confidential workpiece", and the workpiece of the non-confidential target is referred to as a "non-confidential workpiece". The transfer of the pallet to which the workpiece of the confidential target is attached is referred to as "confidential transfer", and the transfer of the pallet to which the non-confidential workpiece is attached is referred to as "non-confidential transfer".

The confidential transfer method (second transfer method), which is different from the non-confidential transfer method (first transfer method), means that a program code for performing the confidential transfer is described separately from a program code for performing the non-confidential transfer. These program codes may be described in one transfer program or in different transfer programs. As long as internal processing differs between the non-confidential transfer and the confidential transfer, concepts of the "confidential transfer" and "non-confidential transfer" referred to in this specification are not deviated even if the transfer paths of the workpieces are the same as a result.

With reference to FIGS. 3 to 8, specific examples 1 to 3 of the non-confidential transfer method and the confidential transfer method will be described below.

Although FIGS. 3 to 8 illustrate an example in which pallet transfer system 10 is constructed with two machine tools 400A, 400B, a number of machine tools constituting pallet transfer system 10 is not limited to two. Pallet transfer system 10 may be constructed with one machine tool or at least three machine tools. Hereinafter, a plurality of machine tools 400A, 400B are collectively referred to as a machine tool 400.

FIGS. 3 to 8 illustrate an example in which pallet transfer system 10 is constructed with two work stations 500A, 500B, but the number of work stations constituting pallet transfer system 10 is not limited to two. Pallet transfer system 10 may be constructed with one work station or at least three work stations. In the following description, a plurality of work stations 500A, 500B are collectively referred to as work station 500.

C1. Specific Example 1

Figure 3:
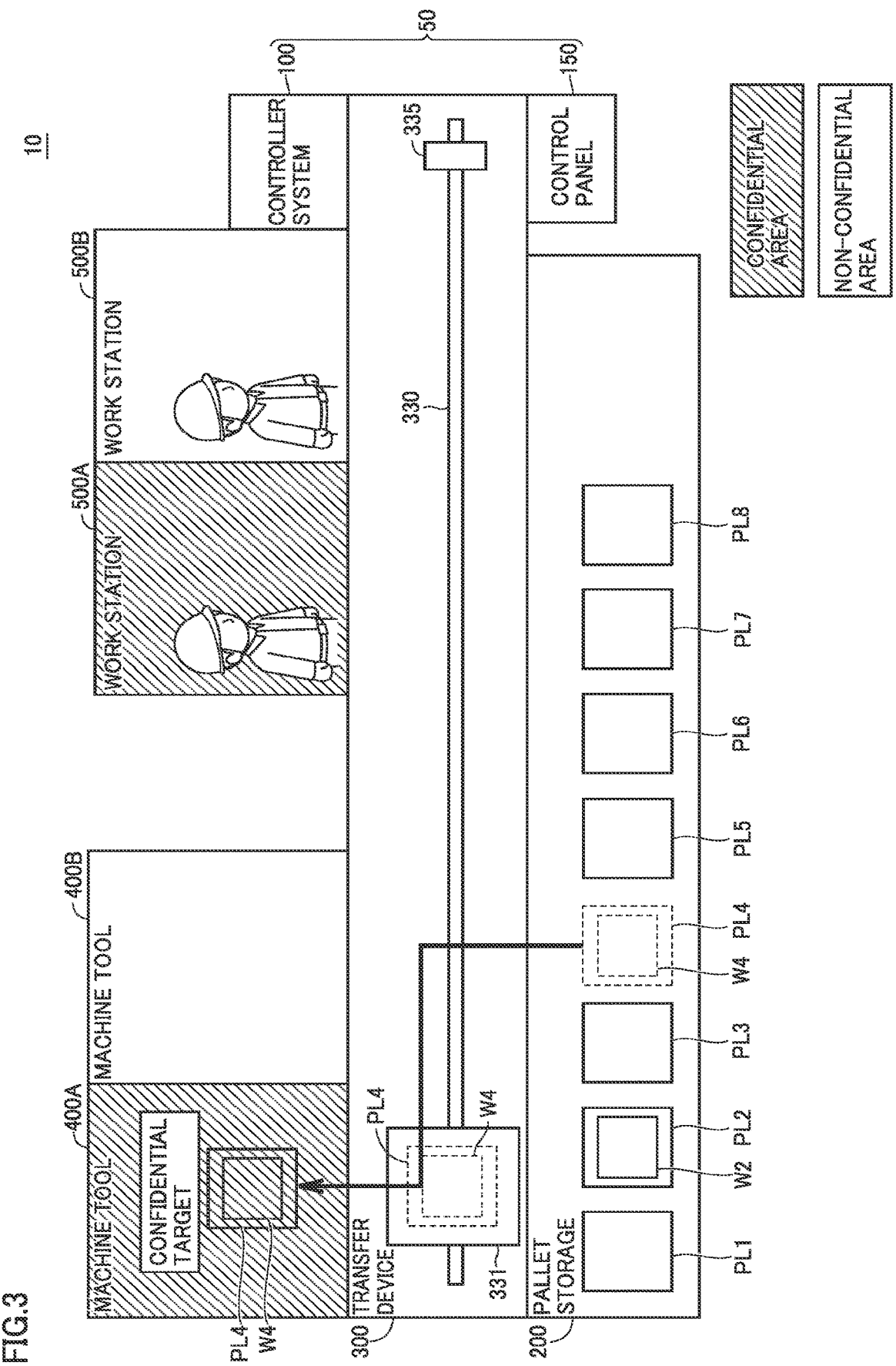
FIG. 3 is a view illustrating a specific example 1 of a confidential transfer method.
Figure 4:
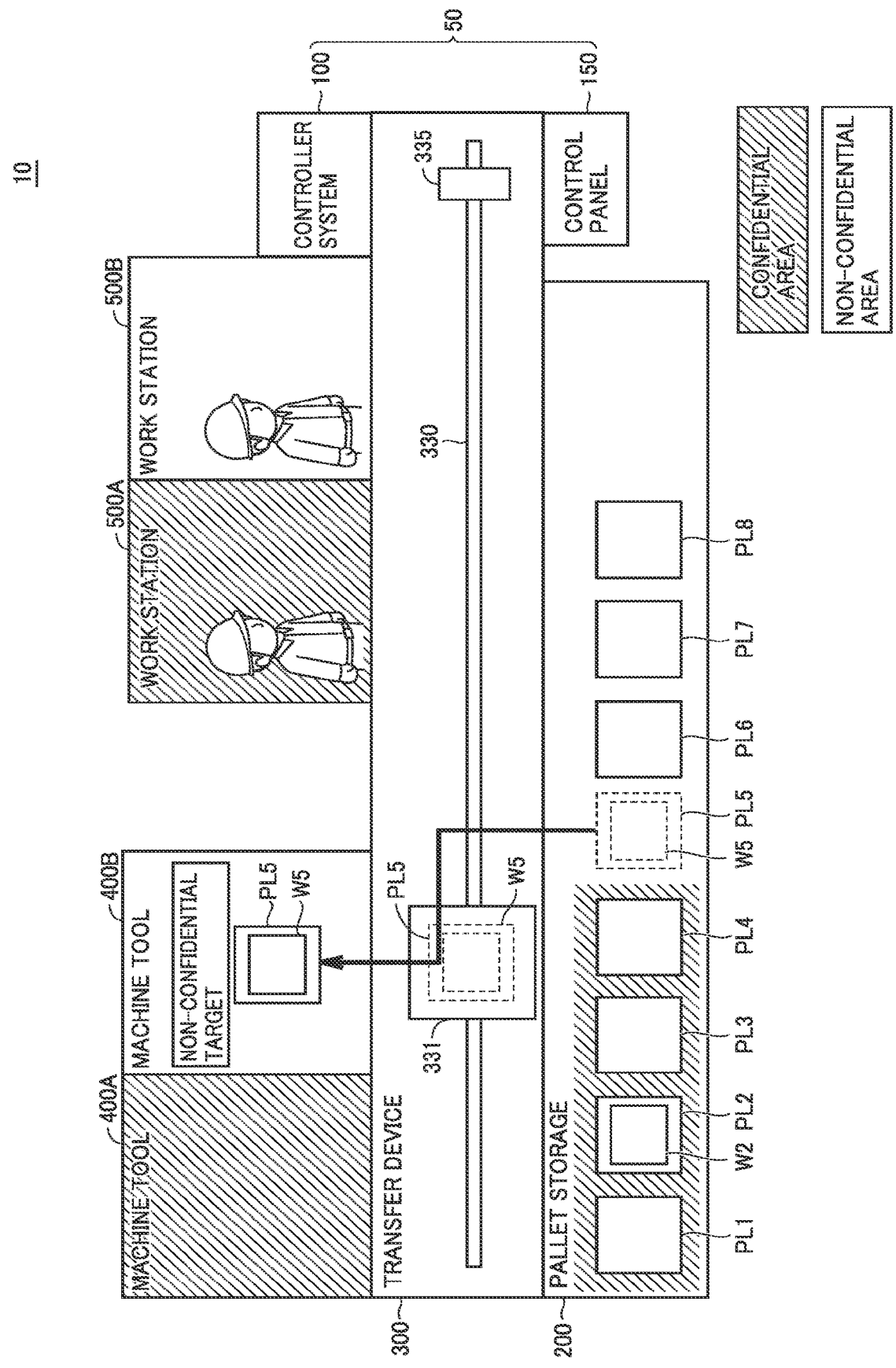
FIG. 4 is a view illustrating the specific example 1 of a non-confidential transfer method.

With reference to FIGS. 3 and 4, a specific example 1 of the confidential transfer method and the non-confidential transfer method will be described. FIG. 3 is a view illustrating the specific example 1 of the confidential transfer method. FIG. 4 is a view illustrating the specific example 1 of the non-confidential transfer method.

In the specific example 1, control device 50 of pallet transfer system 10 changes a transfer path of the pallet to which the workpiece to be machined is attached depending on the non-confidential transfer method and the confidential transfer method.

An administrator previously sets whether or not each of machine tools 400A, 400B is permitted as a transfer destination of the confidential workpiece. In the specific example 1 of FIGS. 3 and 4, machine tool 400A is set as a confidential area, and the confidential workpiece is permitted being transferred for machine tool 400A.

With reference to FIG. 3, the confidential transfer method according to the specific example 1 will be described. At certain timing, it is assumed that transfer timing of a pallet PL4 on which a confidential workpiece W4 is loaded is arrived. Based on this, control device 50 of control system 100 moves carriage 331 to a front of pallet PL4 in pallet storage 200. Then, control device 50 drives fork portion 333 (see FIG. 1) of carriage 331, and puts pallet PL4 on carriage 331. Then, control device 50 transfers pallet PL4 to machine tool 400A set as the confidential area.

As described above, in the confidential transfer, pallet PL4 on which confidential workpiece W4 is loaded is transferred to machine tool 400A predetermined in machine tools 400A, 400B. The machining process of confidential workpiece W4 can be prevented from leaking to surrounding people by machining confidential workpiece W4 with predetermined machine tool 400A.

Although FIG. 3 illustrates an example in which pallet PL4 on which confidential workpiece W4 is loaded is transferred from pallet storage 200, a transfer source of pallet PL4 may be work stations 500A, 500B. In this case, control device 50 transfers pallet PL4 on which confidential workpiece W4 is loaded from work stations 500A, 500B to machine tool 400A.

With reference to FIG. 4, the non-confidential transfer method according to the specific example 1 will be described. At certain timing, it is assumed that the transfer timing of a pallet PL5 on which a non-confidential workpiece W5 is loaded is arrived. Based on this, control device 50 of control system 100 moves carriage 331 to a front of pallet PL5 in pallet storage 200. After that, control device 50 drives fork portion 333 (see FIG. 1) of carriage 331, and puts pallet PL5 on carriage 331. Then, control device 50 transfers pallet PL5 to the unoccupied machine tool in machine tools 400A, 400B. In the example of FIG. 4, pallet PL5 is transferred to machine tool 400B.

In this way, since non-confidential workpiece W5 does not need to be confidential, control device 50 transfers pallet PL5 to the unoccupied machine tool in machine tools 400A, 400B. Typically, pallet PL5 is transferred to machine tool 400B that is not set as a confidential area.

Although FIG. 4 illustrates an example in which pallet PL5 on which non-confidential workpiece W5 is loaded is transferred from pallet storage 200, the transfer source of pallet PL5 may be work stations 500A, 500B. In this case, control device 50 transfers pallet PL5 on which non-confidential workpiece W5 is loaded from work stations 500A, 500B to the unoccupied machine tool in machine tools 400A, 400B.

C2. Specific Example 2

Figure 5:
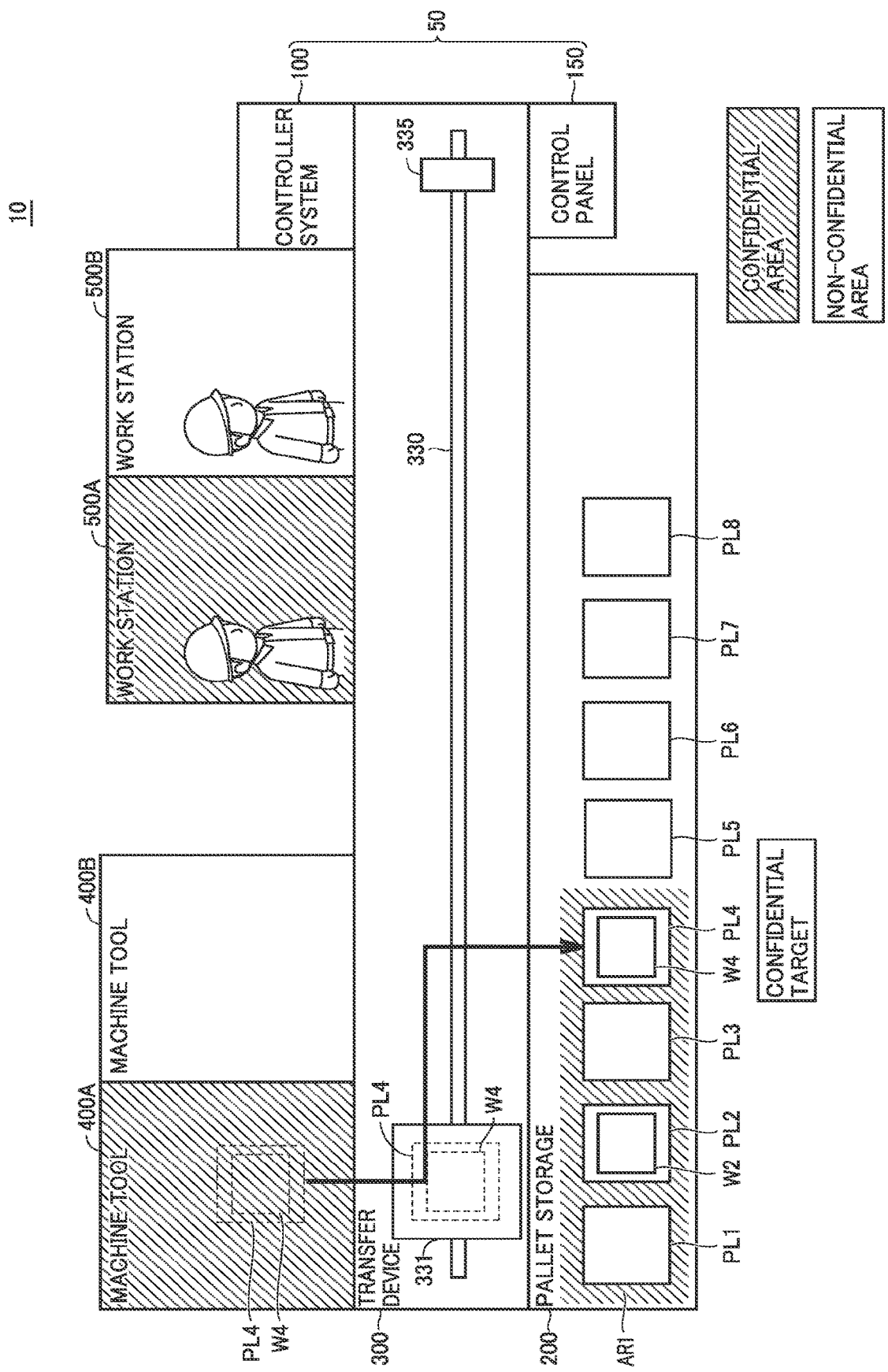
FIG. 5 is a view illustrating a specific example 2 of the confidential transfer method.
Figure 6:
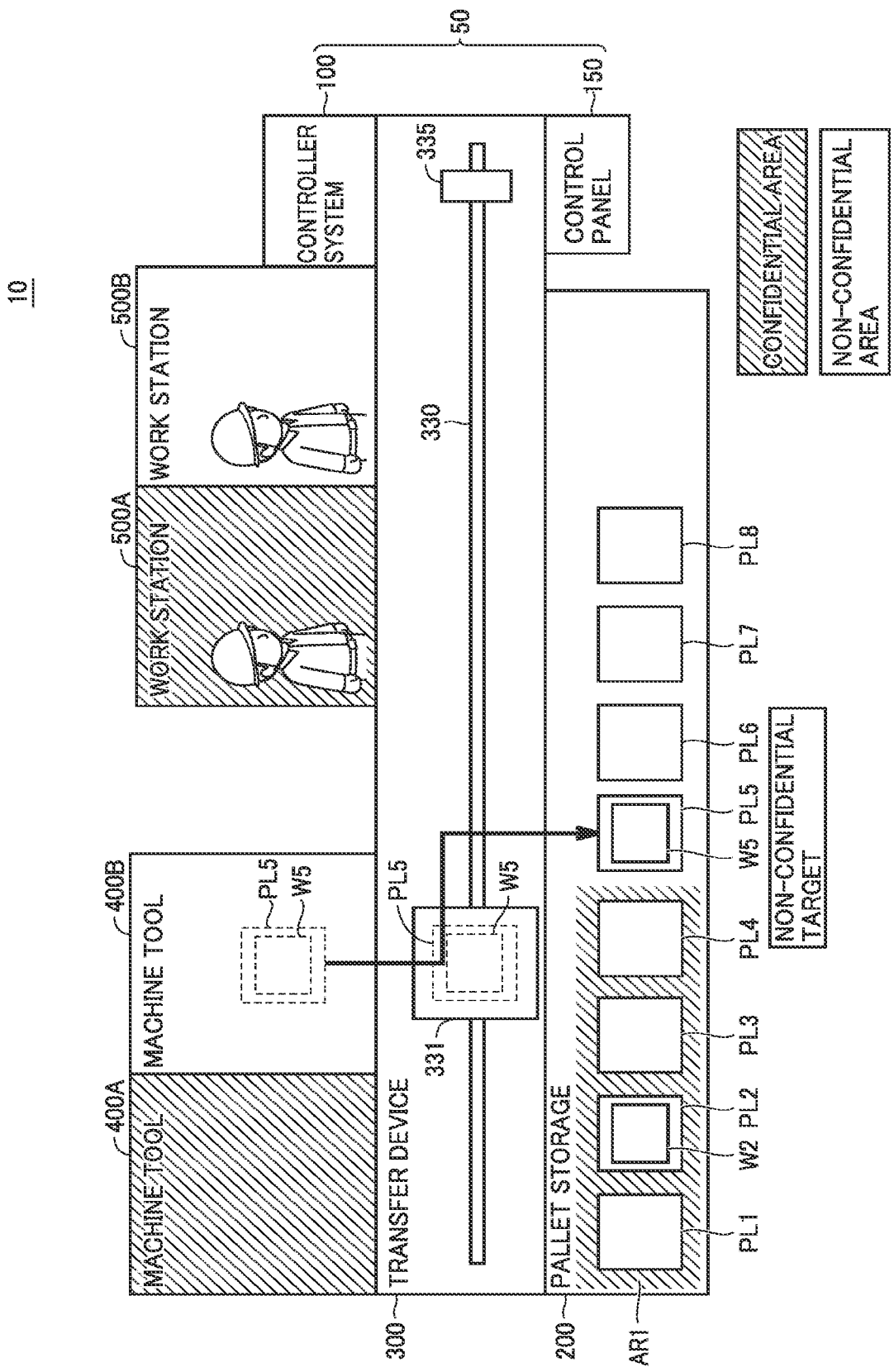
FIG. 6 is a view illustrating the specific example 2 of the non-confidential transfer method.

With reference to FIGS. 5 and 6, a specific example 2 of the confidential transfer method and the non-confidential transfer method will be described below. FIG. 5 is a view illustrating the specific example 2 of the confidential transfer method. FIG. 6 is a view illustrating the specific example 2 of the non-confidential transfer method.

The specific example 2 is the same as the specific example 1 in that the transfer path of the confidential workpiece is different from that of the non-confidential workpiece, but the transfer destination of the workpiece of the specific example 2 is different from that of the specific example 1. In the specific example 2, the confidential workpiece/non-confidential workpiece is transferred to pallet storage 200.

An administrator previously sets whether or not each of the pallet storage locations in pallet storage 200 is permitted as the transfer destination of the confidential workpiece in control system 100. In the specific example 2 of FIGS. 5 and 6, the storage locations of pallets PL1 to PL4 are set as a confidential area AR1, and the transfer of the confidential workpiece is permitted in confidential area AR1.

With reference to FIG. 5, the confidential transfer method according to the specific example 2 will be described. At certain timing, it is assumed that the machining of a confidential workpiece W4 on machine tool 400A is completed. Based on this, control device 50 of control system 100 moves carriage 331 to a front of machine tool 400A. Then, control device 50 drives fork portion 333 (see FIG. 1) of carriage 331, and puts pallet PL4 on carriage 331. Then, control device 50 transfers pallet PL4 to confidential area AR1 of pallet storage 200.

As described above, in the confidential transfer, pallet PL4 on which confidential workpiece W4 is loaded is transferred to the predetermined location in pallet storage 200. As a result, the shape of the confidential workpiece W4 after the machining can be prevented from leaking.

Although FIG. 5 illustrates an example in which pallet PL4 on which confidential workpiece W4 is loaded is transferred from machine tool 400A, the transfer source of pallet PL4 may be work stations 500A, 500B. In this case, control device 50 transfers pallet PL4 on which confidential workpiece W4 is loaded from work stations 500A, 500B to confidential area AR1 in pallet storage 200.

With reference to FIG. 6, the non-confidential transfer method according to the specific example 2 will be described. At certain timing, it is assumed that the machining of a non-confidential workpiece W5 on machine tool 400B is completed. Based on this, control device 50 of control system 100 moves carriage 331 to a front of machine tool 400B. After that, control device 50 drives fork portion 333 (see FIG. 1) of carriage 331, and puts pallet PL5 on carriage 331. Then, control device 50 transfers pallet PL5 to the unoccupied location of pallet storage 200.

In this way, since non-confidential work W5 does not need to be confidential, control device 50 transfers pallet PL5 to an arbitrary unoccupied location in pallet storage 200. Typically, pallet PL5 is transferred to the unoccupied location that is not set as confidential area AR1.

Note that FIG. 6 illustrates an example in which the pallet PL5 on which non-confidential workpiece W5 is loaded is transferred from the pallet storage 200, but the transfer source of the pallet PL5 is may be work stations 500A and 500B. In this case, control device 50 transfers pallet PL5 on which non-confidential workpiece W5 is loaded from work stations 500A, 500B to the unoccupied location other than confidential area AR1 in pallet storage 200.

C3. Specific Example 3

Figure 7:
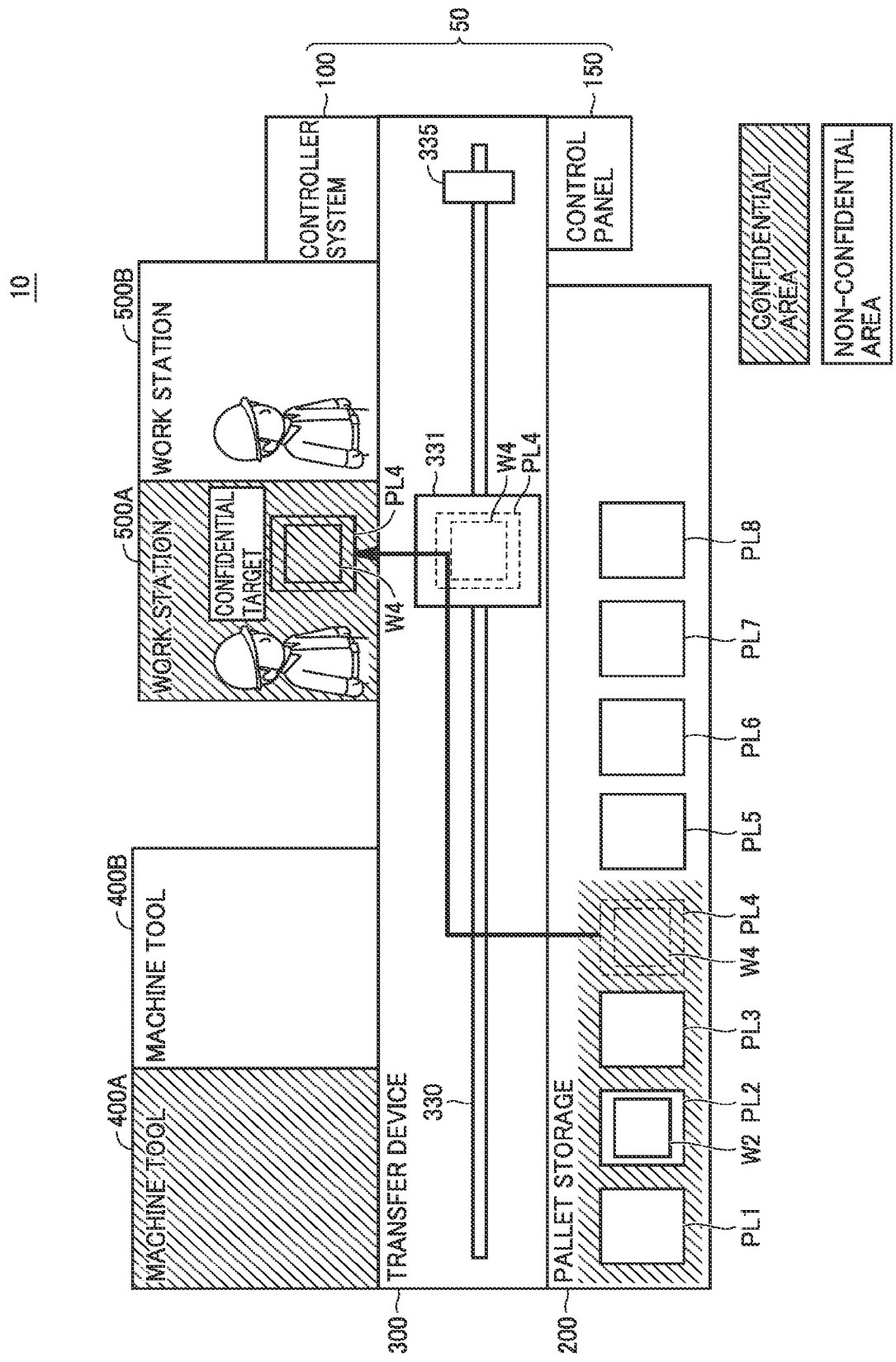
FIG. 7 is a view illustrating a specific example 3 of the confidential transfer method.
Figure 8:
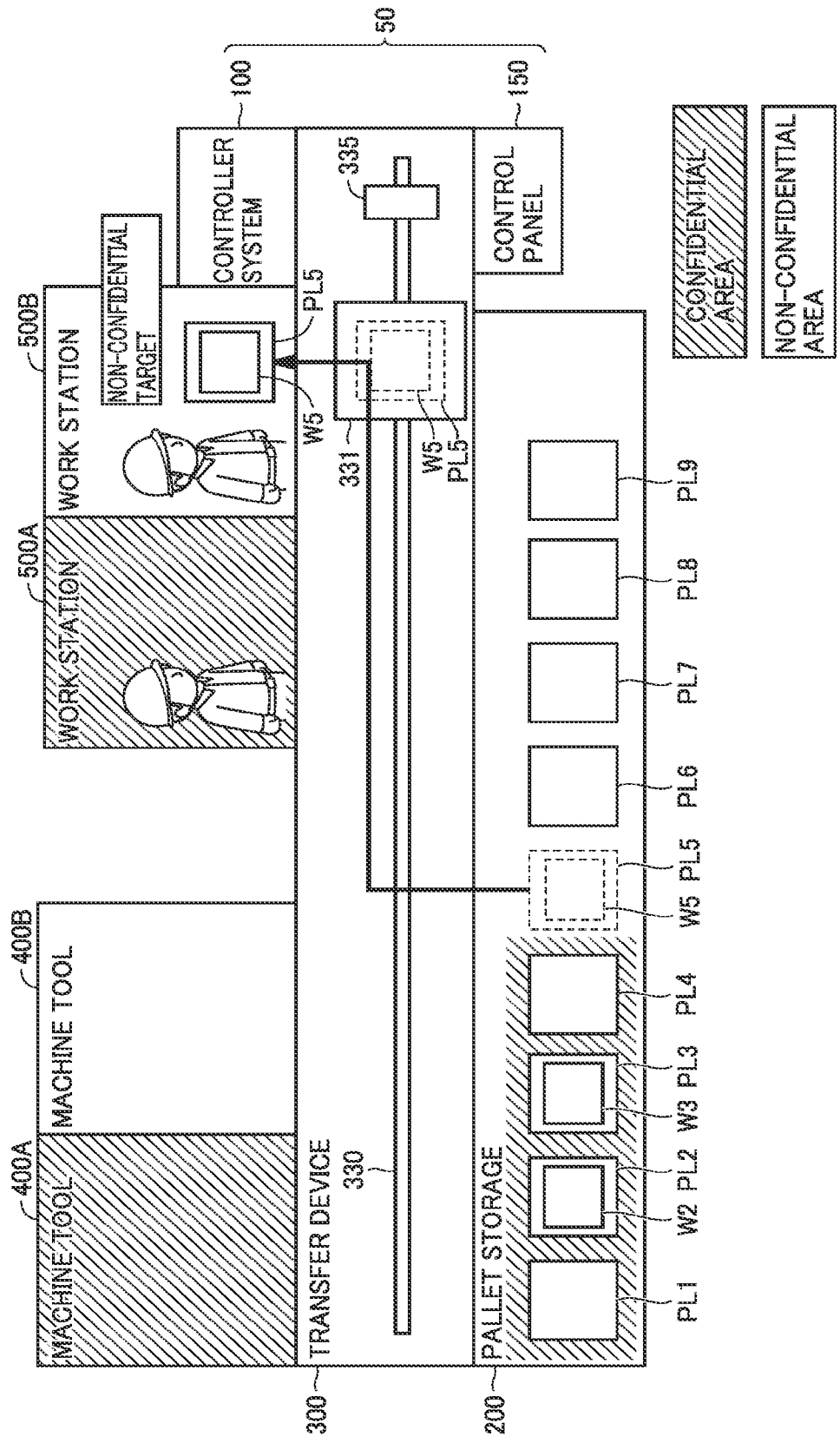
FIG. 8 is a view illustrating the specific example 3 of the non-confidential transfer method.

With reference to FIGS. 7 and 8, a specific example 3 of the confidential transfer method and the non-confidential transfer method will be described. FIG. 7 is a view illustrating the specific example 3 of the confidential transfer method. FIG. 8 is a view illustrating the specific example 3 of the non-confidential transfer method.

The specific example 3 is the same as the specific examples 1, 2 in that the transfer path is changed depending on whether or not the workpiece to be machined is a confidential target, but the transfer destination of the workpiece of the specific example 3 is different from that of the specific examples 1, 2. In the specific example 3, the confidential workpiece/non-confidential workpiece is transferred to work station 500.

The administrator previously sets whether or not each of the work stations 500A, 500B is permitted as the transfer destination of the confidential workpiece in control system 100. In the specific example 3 of FIGS. 7 and 8, work station 500A is set as the confidential area, and the transfer of the confidential workpiece is permitted to work station 500A.

With reference to FIG. 7, the confidential transfer method according to the specific example 3 will be described. At certain timing, it is assumed that transfer timing of a pallet PL4 on which a confidential workpiece W4 is loaded is arrived. Based on this, control device 50 of control system 100 moves carriage 331 to a front of pallet PL4 in pallet storage 200. Then, control device 50 drives fork portion 333 (see FIG. 1) of carriage 331, and puts pallet PL4 on carriage 331. Then, control device 50 transfers pallet PL4 to work station 500A set as the confidential area.

As described above, in the confidential transfer, pallet PL4 on which confidential workpiece W4 is loaded is transferred to predetermined work station 500A in work stations 500A, 500B. As a result, the shape of confidential workpiece W4 can be prevented from leaking.

Although that FIG. 7 illustrates the example in which pallet PL4 on which confidential workpiece W4 is loaded is transferred from pallet storage 200, the transfer source of pallet PL4 may be machine tools 400A, 400B. In this case, control device 50 transfers pallet PL4 on which confidential workpiece W4 is loaded from machine tools 400A, 400B to work station 500A.

With reference to FIG. 8, the non-confidential transfer method according to the specific example 3 will be described. At certain timing, it is assumed that the transfer timing of a pallet PL5 on which a non-confidential workpiece W5 is loaded is arrived. Based on this, control device 50 of control system 100 moves carriage 331 to a front of pallet PL5 in pallet storage 200. After that, control device 50 drives fork portion 333 (see FIG. 1) of carriage 331, and puts pallet PL5 on carriage 331. Then, control device 50 transfers pallet PL5 to the unoccupied machine tool in work stations 500A, 500B. In the example of FIG. 8, pallet PL5 is transferred to work station 500B.

In this way, since the non-confidential workpiece W5 does not need to be confidential, control device 50 transfers pallet PL5 on which non-confidential workpiece W5 is loaded to the unoccupied work station in work stations 500A, 500B. Typically, pallet PL5 is transferred to work station 500B that is not set as the transfer destination of the confidential workpiece.

FIG. 8 illustrates the example in which pallet PL5 on which non-confidential workpiece W5 is loaded is transferred from pallet storage 200, but the transfer source of pallet PL5 may be machine tools 400A, 400B. In this case, control device 50 transfers pallet PL5 on which non-confidential workpiece W5 is loaded from machine tools 400A, 400B to the unoccupied machine tool in work stations 500A, 500B.

<D. Modification of Confidential Transfer Method>

Figure 9:
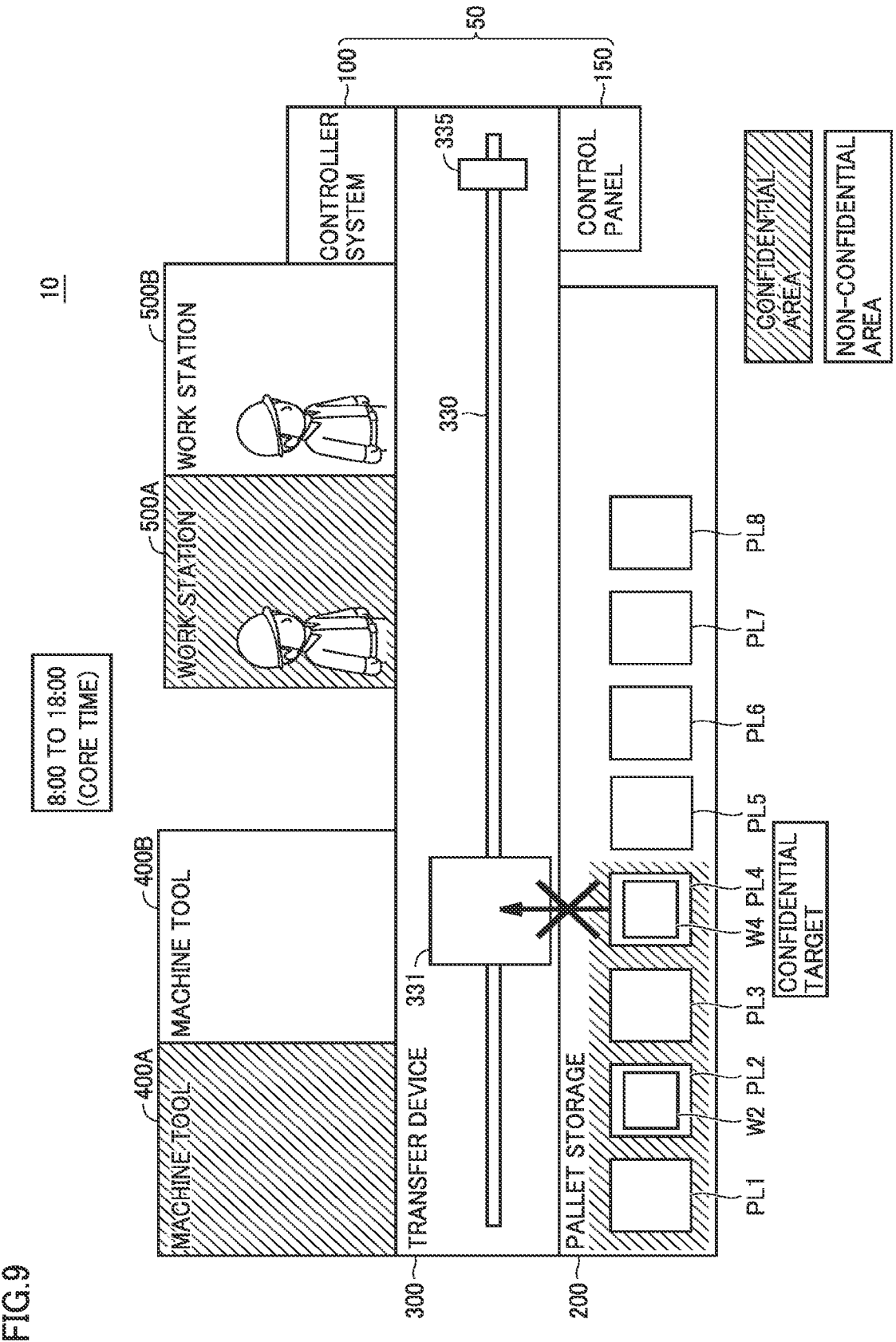
FIG. 9 is a view illustrating the confidential transfer method during a transfer prohibition time period.
Figure 10:
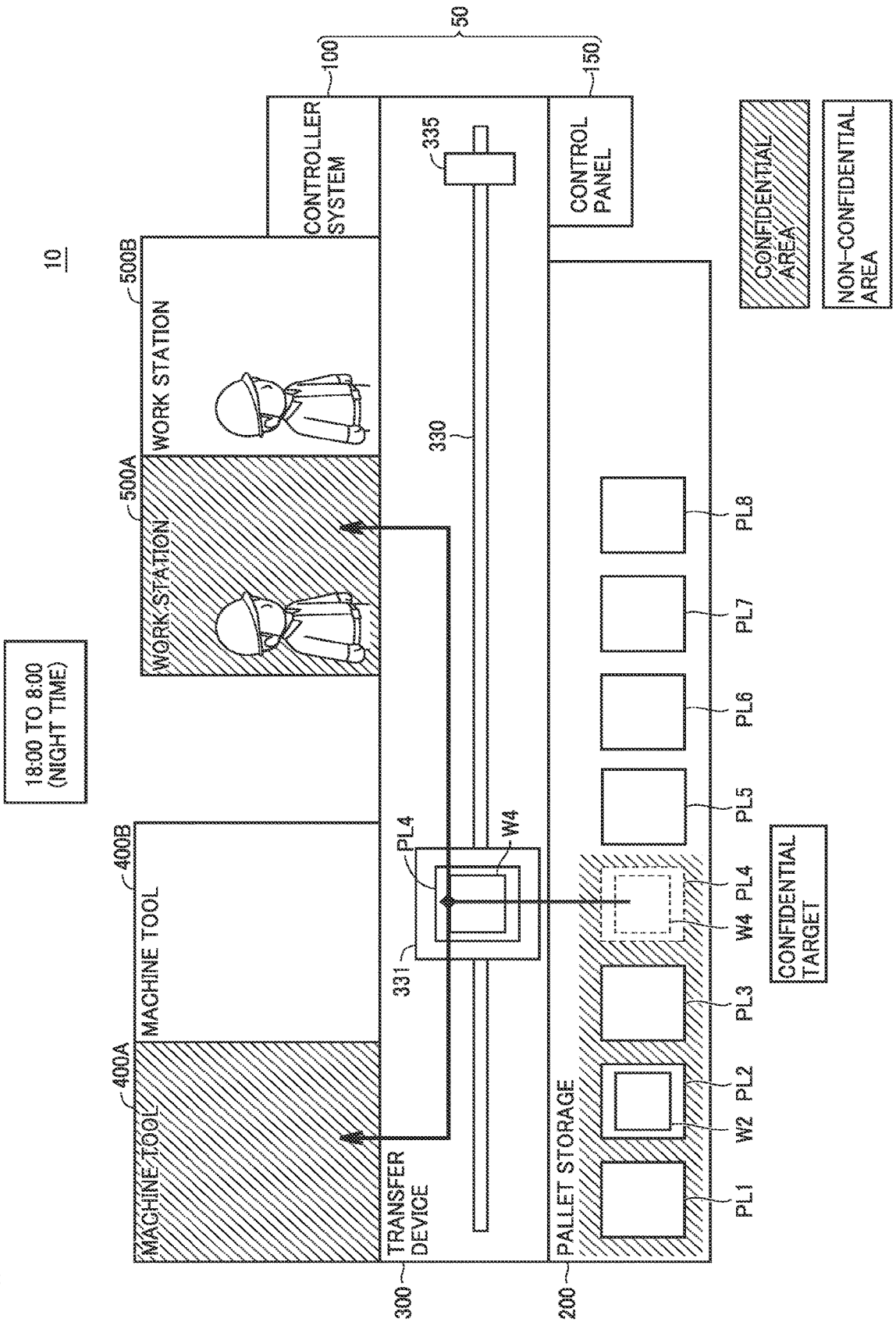
FIG. 10 is a view illustrating the confidential transfer method during a transfer permission time period.

With reference to FIGS. 9 and 10, a modification of the confidential transfer method will be described. In the above description, confidentiality of the confidential workpiece is sought by changing the transfer path between the confidential transfer method and the non-confidential transfer method. On the other hand, in this modification, pallet transfer system 10 prohibits the transfer of the confidential workpiece in a predetermined time period, thereby seeking the confidentiality of the confidential workpiece.

The time period for prohibiting the transfer of the confidential workpiece is previously set by the administrator or the like. In the following description, the time period in which the transfer of the confidential workpiece is prohibited is also referred to as a "transfer prohibition time period". On the other hand, the time period in which the confidential workpiece is permitted to be transferred is also referred to as a "transfer permission time period".

FIG. 9 is a view illustrating the confidential transfer method during the transfer prohibition time period. In the example of FIG. 9, a core time (for example, 8:00 to 18:00) is set as the transfer prohibition time period.

As illustrated in FIG. 9, it is assumed that transfer timing of pallet PL4 on which confidential workpiece W4 is loaded arrives at certain timing during the transfer prohibition time period. When a present time is included in the transfer prohibition time period, control device 50 of pallet transfer system 10 prohibits the transfer of pallet PL4 on which confidential workpiece W4 is loaded. On the other hand, for the pallet on which the non-confidential workpiece is loaded, control device 50 executes the workpiece transfer regardless of whether or not the present time is included in the transfer prohibition time period.

In this manner, the transfer of pallet PL4 on which confidential workpiece W4 is loaded is prohibited during the transfer prohibition time period, so that it is possible to reduce the risk of leakage of information about confidential workpiece W4 to the worker who does not have special authority during the time period when there are many workers (for example, core time).

FIG. 10 is a view illustrating a confidential transfer method during the transfer permission time period. In the example of FIG. 10, a night time period (for example, 18:00 to 8:00) is set as the transfer permission time period.

As illustrated in FIG. 10, it is assumed that the transfer timing of pallet PL5 on which non-confidential workpiece W5 is loaded arrives at certain timing in the transfer permission time period. When the present time is included in the transfer permission time period, control device 50 of pallet transfer system 10 permits the transfer of pallet PL5 and transfers pallet PL5 to the designated transfer destination. At this point, preferably, control device 50 executes the confidential transfer described in the specific examples 1 to 4 and restricts the transfer destination to the predetermined confidential area. In the example of FIG. 10, confidential workpiece W4 is transferred to machine tool 400A or work station 500A, which is set as the confidential area.

<E. Confidential Information Setting Screen>

Control system 100 accepts various settings (hereinafter, also referred to as a "confidential setting") for performing the confidential transfer. With reference to FIG. 11, an example of a confidential setting screen that accepts various settings related to the confidential transfer will be described below.

FIG. 11 is a view illustrating an example of the confidential setting screen. FIG. 11 illustrates a confidential setting screen 130 as an example of the confidential setting screen. Confidential setting screen 130 includes setting fields 131 to 135 that accept a user setting.

Setting field 131 accepts the selection of the confidential target/non-confidential target by a type of the workpiece. As an example, the workpiece in which "YES" is selected in a pull-down menu is set as the confidential target. On the other hand, the workpiece in which "NO" is selected in the pull-down menu is set as the non-confidential target.

Setting field 132 accepts the selection of the confidential area/non-confidential area for each of the plurality of machine tools 400. As an example, the machine tool in which "YES" is selected in the pull-down menu is set as the confidential area. On the other hand, the machine tool in which "NO" is selected in the pull-down menu is set as the non-confidential area.

Setting field 133 accepts the selection of the confidential area/non-confidential area for each of the pallet storage locations in pallet storage 200. As an example, the storage location where "YES" is selected in the pull-down menu is set as the confidential area. On the other hand, the storage location where "NO" is selected in the pull-down menu is set as the non-confidential area.

Setting field 134 accepts the selection of the confidential area/non-confidential area for each of the plurality of work stations 500. As an example, the work station in which "YES" is selected in the pull-down menu is set as the confidential area. On the other hand, the work station in which "NO" is selected in the pull-down menu is set as the non-confidential area.

Setting field 135 accepts the setting of the transfer prohibition time period of the confidential workpiece. The transfer prohibition time period may be set for each day of the week or for each day. When setting field 135 is blank, it is considered that the transfer prohibition time period is not set. The time period other than the set transfer prohibition time period is regarded as the transfer permission time period.

Although FIG. 11 illustrates an example in which the transfer prohibition time period is set in setting field 135, the transfer permission time period may be set in setting field 135 instead. In this case, the time period other than the transfer permission time period is regarded as the transfer prohibition time period.

When an OK button 136 in confidential setting screen 130 is pressed, control system 100 stores various pieces of information set in setting fields 131 to 135 in storage device 120 (FIG. 13) as confidential setting information 126 (see FIG. 13) described later. On the other hand, when a cancel button 137 of confidential setting screen 130 is pressed, control system 100 closes confidential setting screen 130 without saving various pieces of information set in setting fields 131 to 135. Confidential setting information 126 stored in control system 100 is transferred to PLC 151.

In the example of FIG. 11, the description has been made on the assumption that confidential setting information 126 is set by the administrator on confidential setting screen 130. Alternatively, a part or all of confidential setting information 126 may be automatically set. For example, pallet transfer system 10 may automatically specify whether or not each workpiece of the transfer target is the confidential target based on a predetermined image processing. For example, pallet transfer system 10 determines whether or not the workpiece of the transfer target is the confidential target by performing predetermined image processing on the captured image obtained by capturing the workpiece of the transfer target with a camera (not illustrated). Various algorithms can be adopted as a method for determining whether or not the workpiece of the transfer target is the confidential target by using a captured image.

As an example, an image illustrating the workpiece shape of the confidential target (hereinafter, also referred to as a "reference image") is previously prepared. The reference image may be a two-dimensional image or a three-dimensional image. Pallet transfer system 10 compares the captured image obtained by capturing the workpiece of the transfer target with the reference image, and calculates a degree of similarity between the reference image and the captured image. An arbitrary algorithm is adopted as a similarity calculation technique. SSD (Sum of Squared Difference), SAD (Sum of Absolute Difference), NCC (Normalized Cross-Correlation), ZNCC (Zero-mean Normalized Cross-Correlation), or the like can be adopted as the similarity calculation technique.

Pallet transfer system 10 determines that the workpiece of the transfer target is the confidential target when the calculated similarity exceeds a predetermined threshold. On the other hand, pallet transfer system 10 determines that the workpiece of the transfer target is the non-confidential target when the calculated similarity is equal to or less than the predetermined threshold value.

<F. Data Sharing Method>

Figure 12:
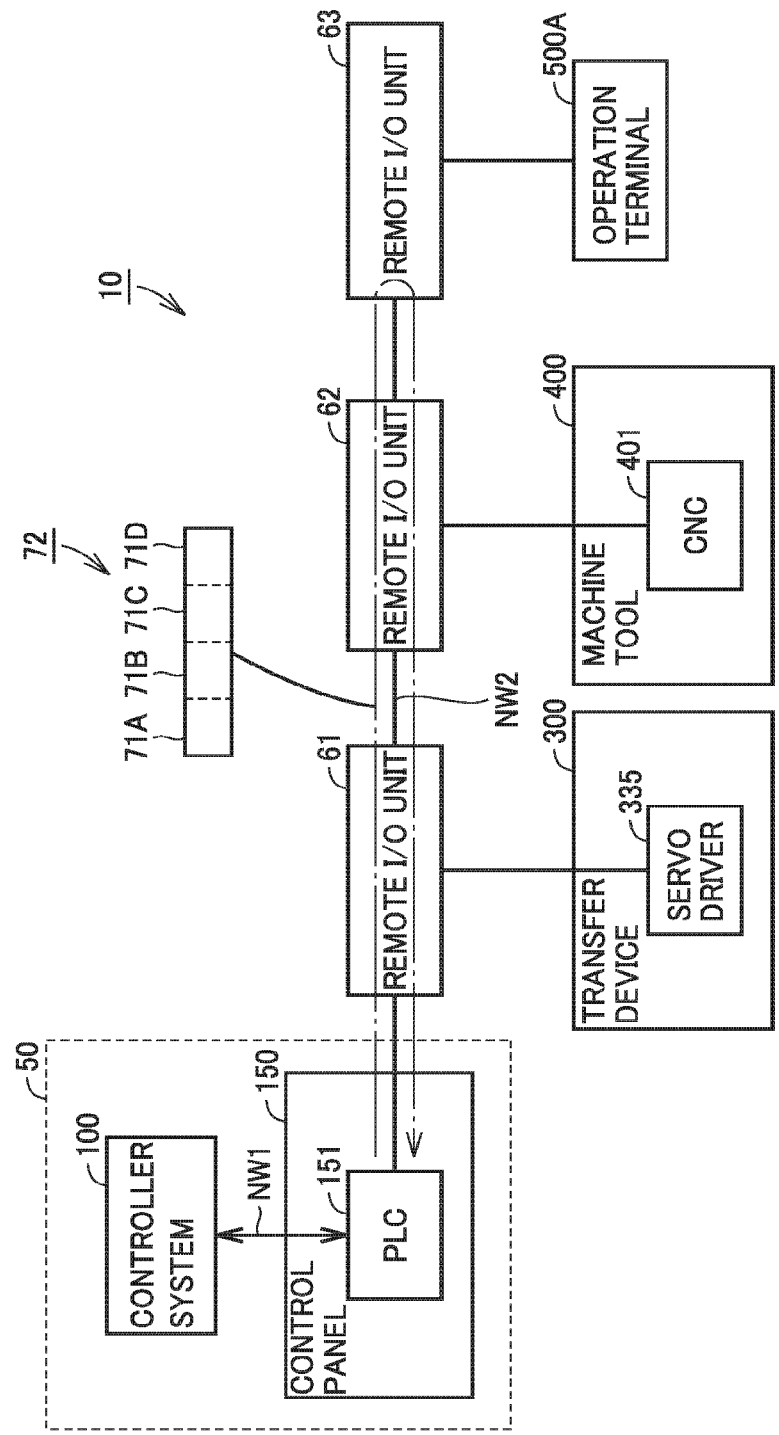
FIG. 12 is a conceptual diagram schematically illustrating a cooperative relationship of various devices constituting a pallet transfer system.

With reference to FIG. 12, a method for sharing data between various devices constituting pallet transfer system 10 will be described. FIG. 12 is a conceptual diagram schematically illustrating a cooperative relationship of various devices constituting pallet transfer system 10.

As described above, control system 100 and PLC 151 are connected to network NW1 such as Ethernet. Remote I/O units 61 to 63 and PLC 151 are connected to network NW2 that is a field network.

A frame 72 is transmitted to network NW2. Frame 72 orbits network NW2 at predetermined control cycles. Remote I/O units 61 to 63 and PLC 151 share various data through frame 72.

For example, frame 72 includes a data area 71A for PLC 151, a data area 71B for transfer device 300 connected to remote I/O unit 61, a data area 71C for machine tool 400 connected to the remote I/O unit 62, and a data area 71D for operation terminal 550 connected to remote I/O unit 63.

Data area 71A of frame 72 is an area in which PLC 151 writes various data. A transfer instruction of pallet PL and the like are written in data area 71A. The transfer instruction includes a transfer destination of pallet PL. For example, the transfer destination is expressed by an identification number indicating a storage location in pallet storage 200 (for example, an ID (Identification) indicating the storage location) or an identification number identifying machine tool 400 (for example, the ID of the machine tool). Various data written in data area 71A by PLC 151 can be referred to by various devices connected to network NW2.

Data area 71B of frame 72 is an area in which remote I/O unit 61 writes various data related to transfer device 300. Various data written in data area 71B are referred to by various devices connected to network NW2.

Data area 71C of frame 72 is an area in which remote I/O unit 62 writes various data related to machine tool 400. Various data written in data area 71C are referred to by various devices connected to network NW2.

For example, data area 71D of frame 72 is an area in which remote I/O unit 63 writes the operation contents for operation terminal 550. As an example, the selection result of permission or refusal for the transfer of the pallet from work station 500 is written in data area 71D of frame 72.

<G. Hardware Configuration of Control System 100>

Figure 13:
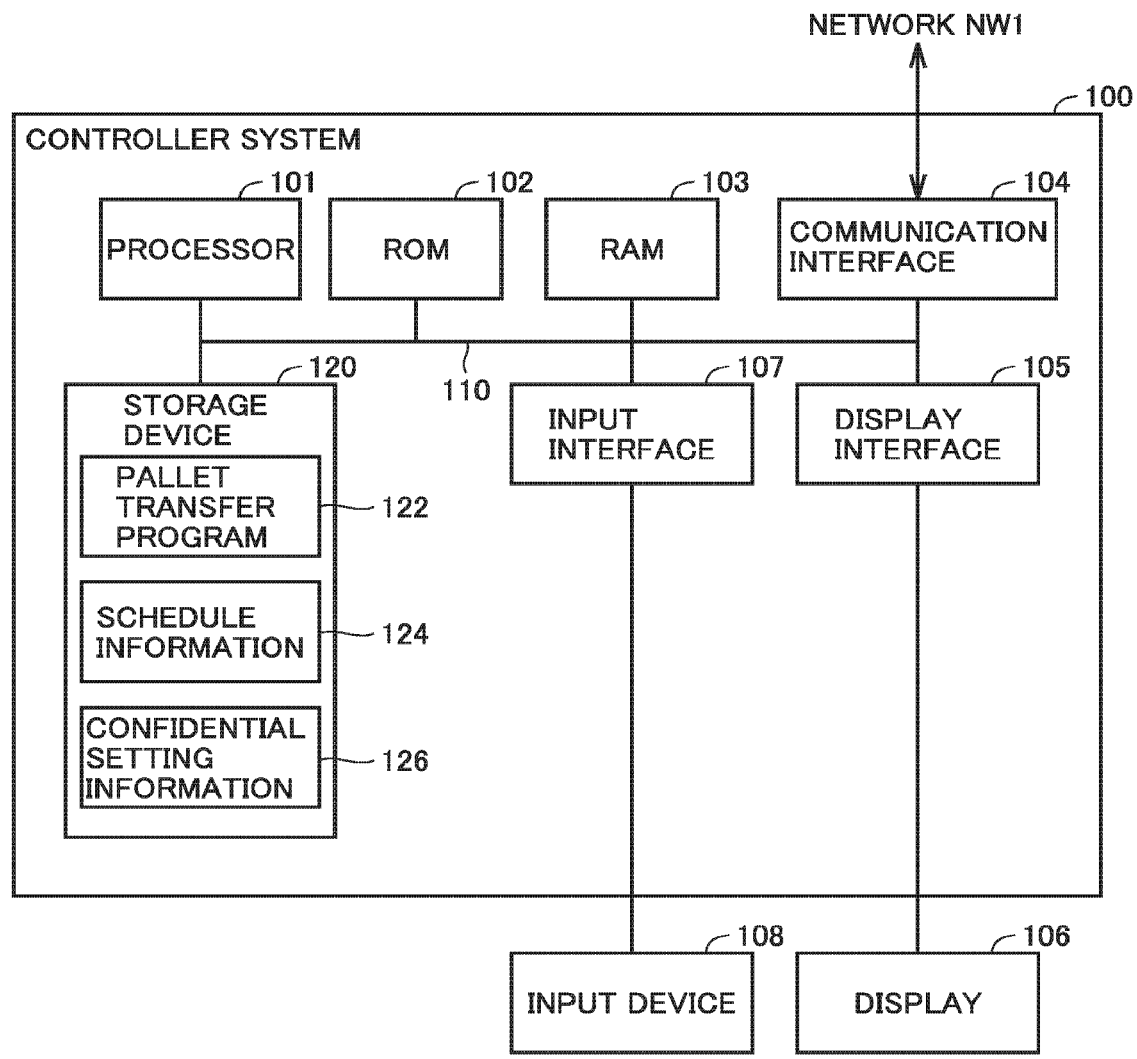
FIG. 13 is a schematic diagram illustrating an example of a hardware configuration of a controller system.

With reference to FIG. 13, the hardware configuration of control system 100 will be described. FIG. 13 is a schematic diagram illustrating an example of the hardware configuration of control system 100.

Control system 100 includes a processor 101, a ROM (Read Only Memory) 102, a RAM (Random Access Memory) 103, a communication interface 104, a display interface 105, an input interface 107, and a storage device 120. These components are connected to a bus 110.

For example, processor 101 is constructed with at least one integrated circuit. For example, the integrated circuit may be constructed with at least one CPU (Central Processing Unit), at least one GPU (Graphics Processing Unit), at least one ASIC (Application Specific Integrated Circuit), at least one FPGA (Field Programmable Gate Array), or a combination thereof.

Processor 101 controls a motion of control system 100 by executing various programs such as a pallet transfer program 122 and an operating system. Processor 101 reads pallet transfer program 122 from storage device 120 or ROM 102 to RAM 103 based on the reception of the execution instruction of pallet transfer program 122. RAM 103 functions as a working memory, and temporarily stores various data necessary for executing pallet transfer program 122.

A LAN (Local Area Network), an antenna, and the like are connected to communication interface 104. Control system 100 is connected to network NW1 through communication interface 104. As a result, control system 100 exchanges data with an external device connected to network NW1. For example, the external device includes a control panel 150, a server (not illustrated), and the like. Control system 100 may be configured so as to download pallet transfer program 122 from the external device.

Display 106 is connected to display interface 105. Display interface 105 sends an image signal that displays an image to display 106 according to a command from processor 101 or the like. For example, display 106 is a liquid crystal display, an organic EL (Electro Luminescence) display, or other display devices. Display 106 may be configured integrally with control system 100, or may be configured separately from control system 100. For example, confidential setting screen 130 (see FIG. 11) is displayed on display 106.

An input device 108 is connected to input interface 107. For example, input device 108 is a mouse, a keyboard, a touch panel, or other devices capable of accepting user operations. Input device 108 may be integrally configured with control system 100, or may be configured separately from control system 100.

For example, storage device 120 is a storage medium such as a hard disk or a flash memory. Storage device 120 stores pallet transfer program 122, schedule information 124, confidential setting information 126, and the like. Transfer order of the pallet (or the workpiece), a machining priority of the pallet (or the workpiece), and the like are defined in schedule information 124. Confidential setting information 126 includes various pieces of information set on the above-mentioned confidential setting screen 130 (see FIG. 11). The storage location of various data stored in storage device 120 is not limited to storage device 120, but may be stored in a storage area (for example, cache memory) of the processor 101, ROM 102, RAM 103, an external device (for example, a server), and the like.

Pallet transfer program 122 may be provided not as a stand-alone program, but as a part of any program. In this case, the transfer control processing by pallet transfer program 122 is performed in cooperation with an arbitrary program. Even a program that does not include such a part of modules does not deviate from the purpose of pallet transfer program 122 according to the present embodiment. Further, some or all of the functions provided by pallet transfer program 122 may be performed by dedicated hardware. Further, control system 100 may be configured in a form of what is called cloud service in which at least one server executes a part of the processing of pallet transfer program 122.

<H. Hardware Configuration of PLC 151>

Figure 14:
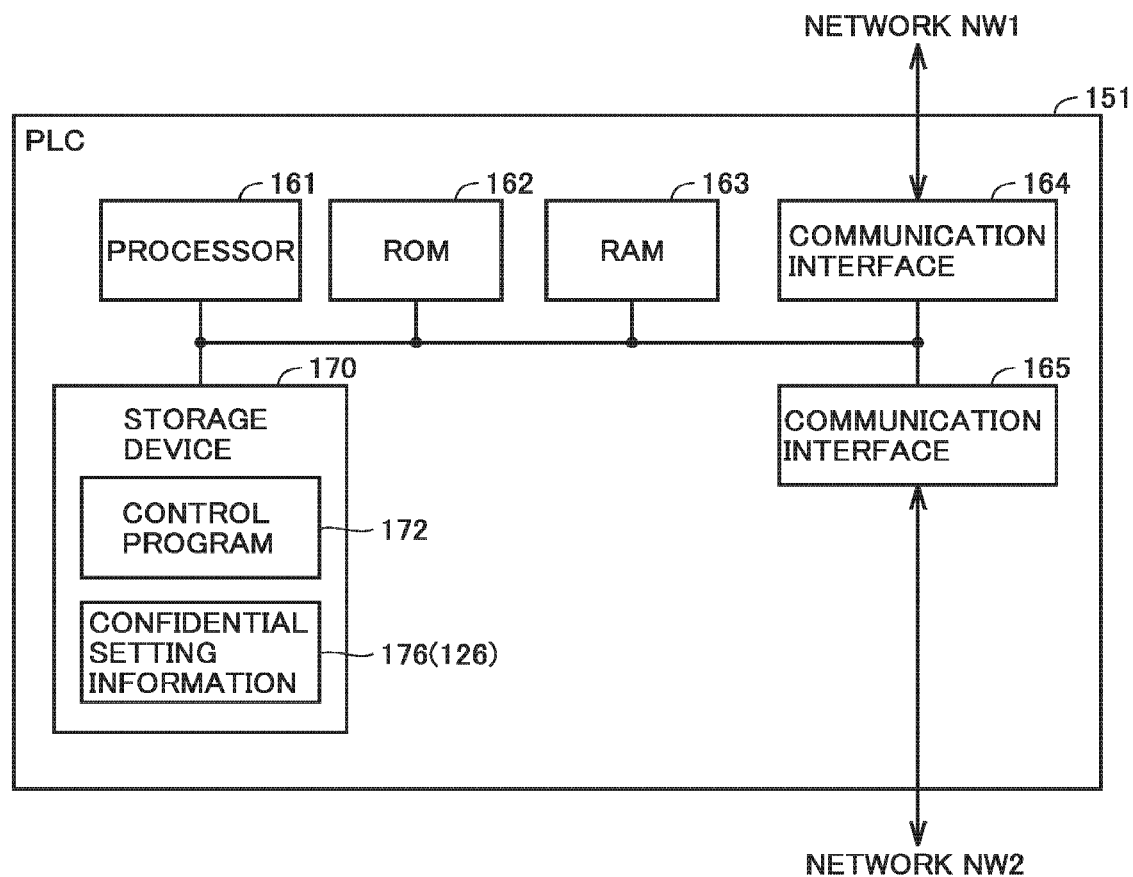
FIG. 14 is a block diagram illustrating a main hardware configuration of a PLC (Programmable Logic Controller).

With reference to FIG. 14, an example of the hardware configuration of PLC 151 will be described. FIG. 14 is a block diagram illustrating the main hardware configuration of PLC 151.

PLC 151 includes a processor 161, a ROM (Read Only Memory) 162, a RAM (Random Access Memory) 163, communication interfaces 164, 165, and a storage device 170.

Processor 161 is constructed with at least one integrated circuit. For example, the integrated circuit is constructed with at least one CPU, at least one MPU (Micro Processing Unit), at least one ASIC, at least one FPGA, or a combination thereof.

Processor 161 controls the motions of transfer device 300 and machine tool 400 by executing various programs such as a control program 172. Processor 161 reads control program 172 from storage device 170 to ROM 162 based on the reception of an execution instruction of control program 172. RAM 163 functions as a working memory, and temporarily stores various data necessary for the execution of control program 172.

A LAN, an antenna, and the like are connected to communication interface 164. PLC 151 is connected to network NW1 through communication interface 164. As a result, PLC 151 exchanges data with an external device connected to network NW1. For example, the external device includes control system 100, a server (not illustrated), and the like.

Communication interface 165 is an interface connected to network NW2 that is a field network. PLC 151 exchanges data with an external device connected to network NW2 through communication interface 165. For example, the external device includes remote I/O units 61 to 63 and the like.

For example, storage device 170 is a storage medium such as a hard disk or a flash memory. Storage device 170 stores control program 172, confidential setting information 176, and the like. Confidential setting information 176 corresponds to confidential setting information 126 received from control system 100. The storage location of various data stored in storage device 170 is not limited to the storage device 170, but the various data may be stored in the storage area of processor 161 (for example, cache area), ROM 162, RAM 163, an external device (for example, server), and the like.

Control program 172 may be provided not as a standalone program, but as a part of any program. In this case, the control processing according to the present embodiment is performed in cooperation with an arbitrary program. Even a program that does not include such a part of modules does not deviate from the purpose of control program 172 according to the present embodiment. Further, some or all of the functions provided by control program 172 may be performed by dedicated hardware. Further, PLC 151 may be configured in a form of what is called cloud service in which at least one server executes a part of the processing of control program 172.

<I. Hardware Configuration of Machine Tool 400>

Figure 15:
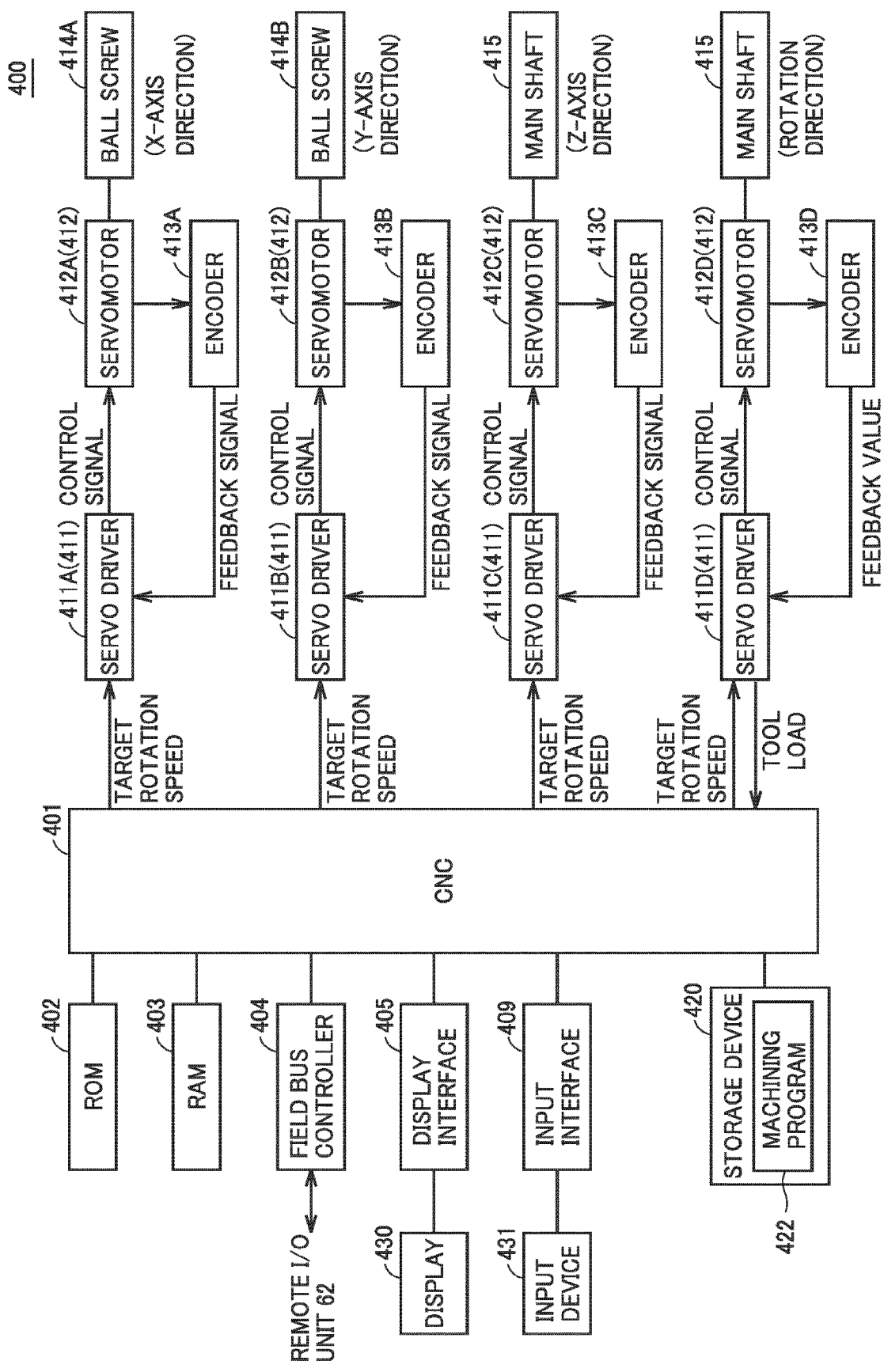
FIG. 15 is a block diagram illustrating a main hardware configuration of a machine tool.

With reference to FIG. 15, an example of the hardware configuration of machine tool 400 will be described. FIG. 15 is a block diagram illustrating the main hardware configuration of machine tool 400.

Machine tool 400 includes a CNC 401, a ROM 402, a RAM 403, a field bus controller 404, a display interface 405, an input interface 409, servo drivers 411A to 411D, servomotors 412A to 412D, encoders 413A to 413D, ball screws 414A, 414B, and a main shaft 415 that attaches tools. These devices are connected through a bus (not illustrated).

CNC 401 is constructed with at least one integrated circuit. For example, the integrated circuit is constructed with at least one CPU, at least one MPU, at least one ASIC, at least one FPGA, or a combination thereof.

CNC 401 controls the motion of machine tool 400 by executing various programs such as machining program 422. CNC 401 reads machining program 422 from storage device 420 in ROM 402 based on the reception of the execution instruction of machining program 422. RAM 403 functions as a working memory, and temporarily stores various data necessary for executing machining program 422.

Field bus controller 404 is an interface that conducts communication with PLC 151 through remote I/O unit 62. CNC 401 exchanges data with PLC 151 through field bus controller 404.

Display interface 405 is connected to a display device such as a display 430, and sends an image signal that displays an image to display 430 according to a command from CNC 401 or the like. For example, display 430 is a liquid crystal display, an organic EL display, or other display devices.

Input interface 409 may be connected to an input device 431. For example, input device 431 is a mouse, a keyboard, a touch panel, or other input devices capable of accepting user operations.

CNC 401 controls servo driver 411A according to machining program 422. Servo driver 411A sequentially receives the input of the target rotation speed (or the target position) from CNC 401, controls servomotor 412A so that servomotor 412A rotates at the target rotation speed, and drives a workpiece installation table (not illustrated) in an X-axis direction. More specifically, servo driver 411A calculates the actual rotation speed (or actual position) of servomotor 412A from a feedback signal of encoder 413A, increases the rotation speed of servomotor 412A when the actual rotation speed is smaller than the target rotation speed, and decreases the rotation speed of servomotor 412A when the actual rotation speed is larger than the target rotation speed. In this way, servo driver 411A brings the rotation speed of servomotor 412A close to the target rotation speed while sequentially receiving feedback of the rotation speed of servomotor 412A. Servo driver 411A moves the workpiece installation table connected to ball screw 414A in the X-axis direction, and moves the workpiece installation table to an arbitrary position in the X-axis direction.

By the same motor control, servo driver 411B moves the workpiece installation table connected to ball screw 414B in a Y-axis direction according to the control command from CNC 401, and moves the workpiece installation table to an arbitrary position in the Y-axis direction. By the same motor control, servo driver 411C moves main shaft 415 in a Z-axis direction according to the control command from CNC 401, and moves main shaft 415 to an arbitrary position in the Z-axis direction. By the same motor control, servo driver 411D controls the rotation speed of main shaft 415 according to the control command from CNC 401.

For example, storage device 420 is a storage medium such as a hard disk or a flash memory. Storage device 420 stores machining program 422 and the like. The storage location of machining program 422 is not limited to storage device 420, but may be stored in the storage area (for example, a cache area) of CNC 401, ROM 402, RAM 403, an external device (for example, a server), or the like.

<J. Hardware Configuration of Operation Terminal 550>

Figure 16:
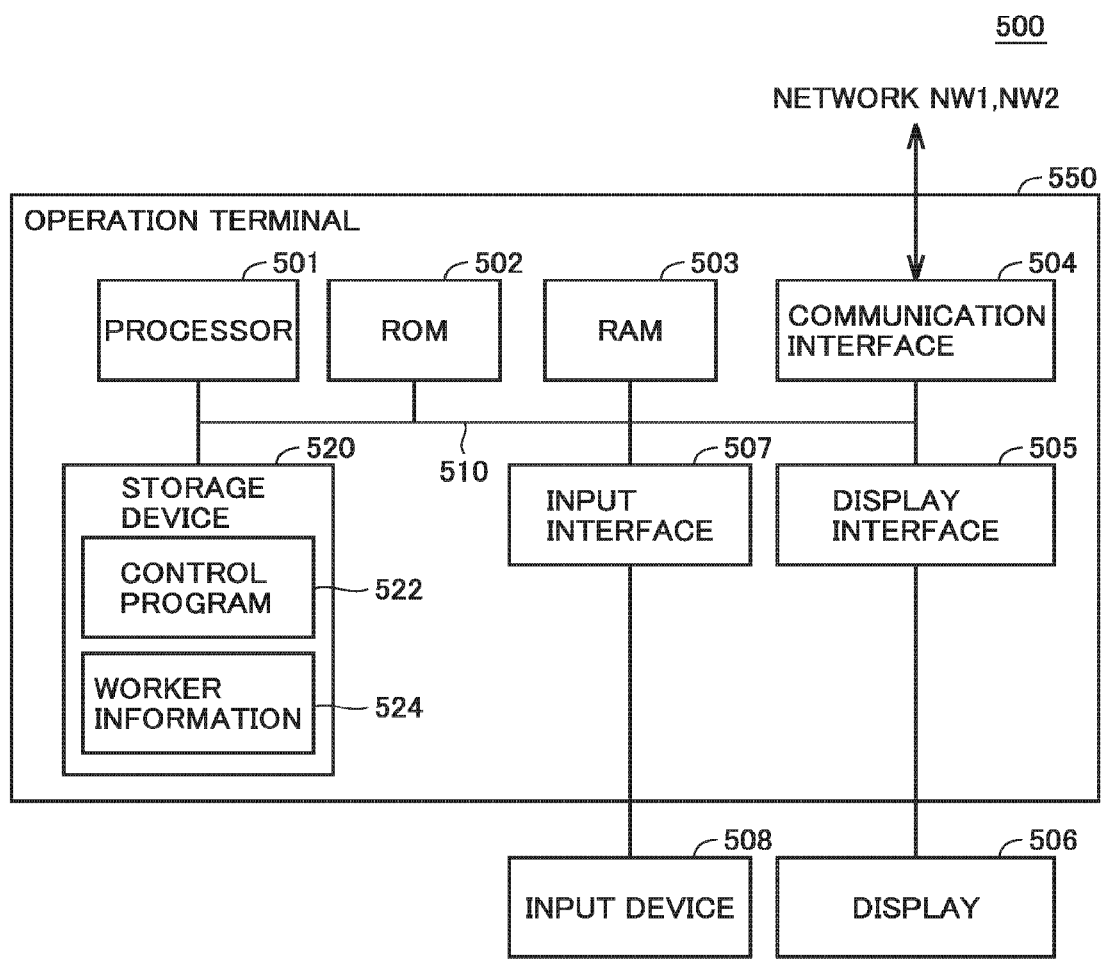
FIG. 16 is a schematic diagram illustrating an example of a hardware configuration of an operation terminal.

With reference to FIG. 16, the hardware configuration of operation terminal 550 installed in work station 500 will be described. FIG. 16 is a schematic diagram illustrating an example of the hardware configuration of operation terminal 550.

Operating terminal 550 includes a processor 501, a ROM 502, a RAM 503, a communication interface 504, a display interface 505, an input interface 507, and a storage device 520. These components are connected to a bus 510.

For example, processor 501 is constructed with at least one integrated circuit. For example, the integrated circuit may be constructed with at least one CPU, at least one GPU, at least one ASIC, at least one FPGA, or a combination thereof.

Processor 501 controls motion of operation terminal 550 by executing various programs such as a control program 522 and an operating system. Processor 501 reads control program 522 from storage device 520 or ROM 502 to RAM 503 based on the reception of the execution instruction of control program 522. RAM 503 functions as a working memory, and temporarily stores various data necessary for the execution of control program 522.

A LAN, an antenna, and the like are connected to communication interface 504. Operation terminal 550 is connected to networks NW1, NW2 through communication interface 504. As a result, operation terminal 550 exchanges data with external devices connected to networks NW1, NW2. For example, the external device includes a control panel 150, a server (not illustrated), and the like. Operation terminal 550 may be configured so that control program 522 can be downloaded from the external device.

A display 506 is connected to display interface 505. Display interface 505 sends an image signal that displays an image to display 506 according to a command from processor 501 or the like. Display 506 displays a selection screen that accepts the permission or refusal of forced transmission of the in-process pallet at work station 500 or the like. For example, display 506 is a liquid crystal display, an organic EL display, or other display devices. Display 506 may be configured integrally with operation terminal 550, or separately from operation terminal 550.

An input device 508 is connected to input interface 507. For example, input device 508 is a mouse, a keyboard, a touch panel, or other devices capable of accepting a user operation. Input device 508 may be configured integrally with operation terminal 550, or separately from operation terminal 550.

For example, storage device 520 is a storage medium such as a hard disk or a flash memory. Storage device 520 stores control program 522, worker information 524, and the like. In worker information 524, the authority given to each worker is defined for each worker ID. The storage location of control program 522 and worker information 524 is not limited to storage device 520, but may be stored in the storage area of processor 501 (for example, cache memory), ROM 502, RAM 503, the external device (for example, server), and the like.

Control program 522 may be provided as a stand-alone program, but as a part of an arbitrary program. In this case, the control processing by control program 522 is performed in cooperation with an arbitrary program. Even a program that does not include such a part of modules does not deviate from the purpose of control program 522 according to the present embodiment. Further, some or all of the functions provided by control program 522 may be performed by dedicated hardware. Further, operation terminal 550 may be configured in a form of what is called cloud service in which at least one server executes a part of the processing of control program 522.

<K. Display Restriction>

With reference to FIG. 16, the display screen on display 506 of operation terminal 550 will be described.

At work station 500, the worker performs the work of attaching the workpiece to the carried-in pallet, the work of removing the machined workpiece from the carried-in pallet. In this course of work, information for supporting the worker is displayed on display 506. As an example, the work process, a work procedure, a work precaution, and the like are displayed as the support information for the worker. The worker can efficiently work by performing the work while checking the displayed support information.

At this point, processor 501 of operation terminal 550 functions as a display control part and controls displaying of display 506. More specifically, processor 501 displays information about the workpiece of the confidential target on display 506 when predetermined first authority is given to the worker in work station 500. On the other hand, processor 501 restricts the displaying of part of the information about the confidential workpiece when second authority lower than the first authority is given to the worker in work station 500. The machining shape of the confidential workpiece and the machining process of the confidential workpiece can be cited as an example of the restricted display information. The leakage of the confidential information of the workpiece is prevented by restricting disclosure of the information about the confidential workpiece to the worker to whom the second authority is given.

The type of authority given to the worker can be specified in various methods. As an example, the authority of each worker is previously registered by the administrator. This registered content is stored in storage device 520 as worker information 524. In worker information 524, the authority given to each worker is defined for each worker ID. At the beginning of the work, the worker inputs the own worker ID using input device 508 and logs in operation terminal 550. Based on this, processor 501 of operation terminal 550 refers to worker information 524 to specify the type of the authority associated with the input worker ID (log-in information).

<L. Control Flow>

Figure 17:
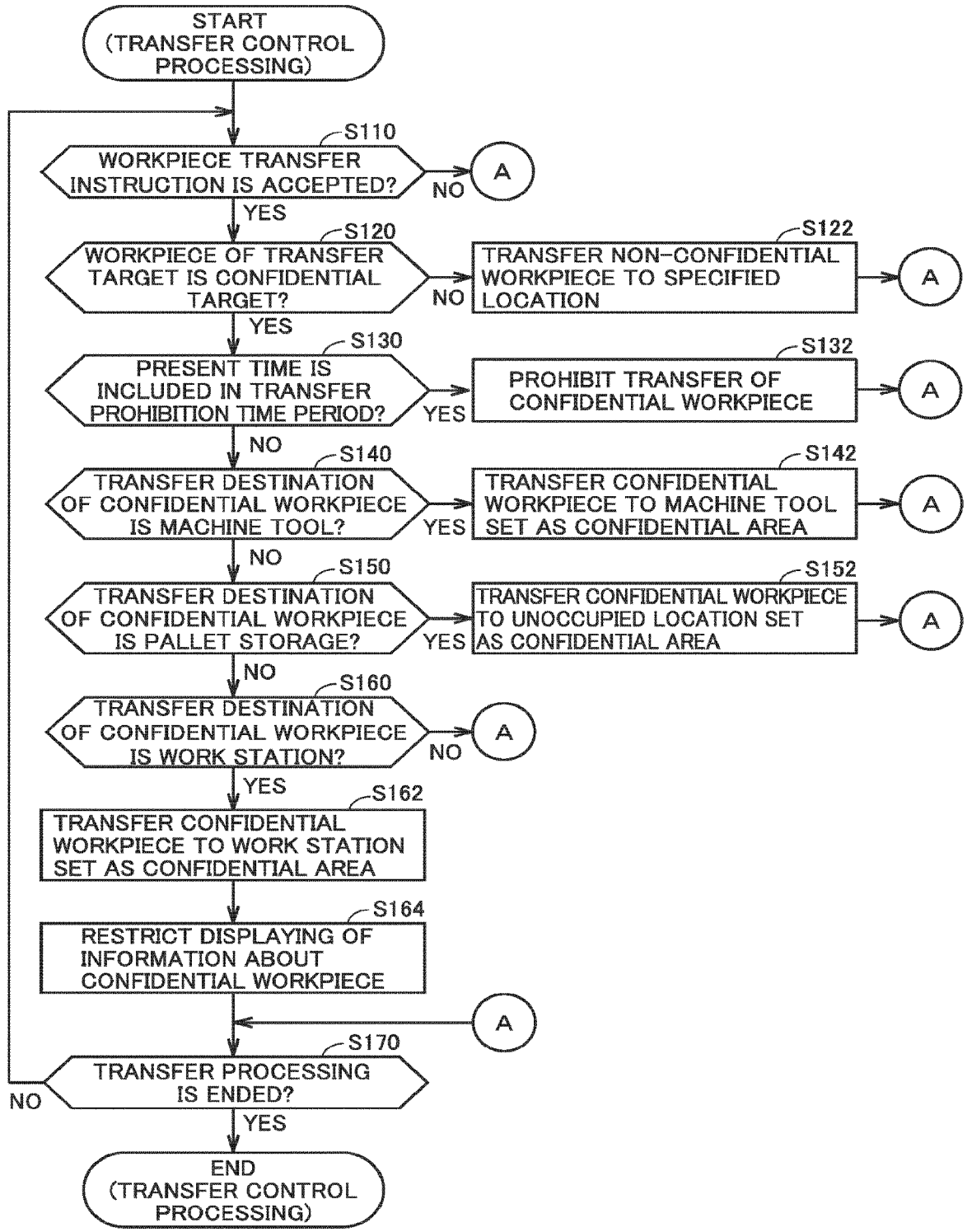
FIG. 17 is a flowchart illustrating a part of transfer processing executed by a processor of the operation terminal.

With reference to FIG. 17, a control flow of processor 161 of PLC 151 will be described. FIG. 17 is a flowchart illustrating a part of the transfer processing executed by processor 161.

In step S110, processor 161 determines whether or not the workpiece transfer command is accepted. As an example, the transfer command is issued based on the execution of an instruction code indicating the transfer of the workpiece on the transfer program. For example, the instruction code defines identification information about the workpiece of the transfer target, the transfer destination of the workpiece, and the like. Processor 161 switches the control to step S170 when determining that the workpiece transfer command is received (YES in step S110). Otherwise (NO in step S110), processor 161 switches the control to step S120.

In step S120, processor 161 determines whether or not the workpiece of the transfer target is the confidential target based on confidential setting information 176 (see FIG. 14). Processor 161 switches the control to step S130 when determining that the workpiece of the transfer target is the confidential target (YES in step S120). Otherwise (NO in step S120), processor 161 switches the control to step S122.

In step S122, processor 161 transfers the non-confidential workpiece to a location specified on the transfer program.

In step S130, processor 161 specifies the transfer prohibition time period from confidential setting information 176 (see FIG. 14), and determines whether or not the present time is included in the transfer prohibition time period. Processor 161 switches the control to step S132 when determining that the present time is included in the transfer prohibition time period (YES in step S130). Otherwise (NO in step S130), processor 161 switches the control to step S140.

In step S132, processor 161 prohibits the transfer of the confidential workpiece. Typically, processor 161 executes nothing in step S132 and proceeds the processing to step S170. Alternatively, processor 161 outputs a predetermined warning, and proceeds the processing to step S170.

In step S140, processor 161 determines whether or not the transfer destination of the confidential workpiece is machine tool 400. For example, whether or not the transfer destination is machine tool 400 is determined based on the transfer command received in step S120. Processor 161 switches the control to step S142 when determining that the transfer destination of the confidential workpiece is machine tool 400 (YES in step S140). Otherwise (NO in step S140), processor 161 switches the control to step S150.

In step S142, processor 161 specifies machine tools 400 set as the confidential area from confidential setting information 176 (see FIG. 14), and transfers the confidential workpiece to unoccupied machine tool 400 in specified machine tools 400.

In step S150, processor 161 determines whether or not the transfer destination of the confidential workpiece is pallet storage 200. For example, whether or not the transfer destination is pallet storage 200 is determined based on the transfer command received in step S120. Processor 161 switches the control to step S152 when determining that the transfer destination of the confidential workpiece is pallet storage 200 (YES in step S150). Otherwise (NO in step S150), processor 161 switches the control to step S160.

In step S152, processor 161 specifies the storage locations in pallet storage 200 set as the confidential area from confidential setting information 176 (see FIG. 14), and transfers the confidential workpiece to any of the unoccupied locations in the specified storage locations.

In step S160, processor 161 determines whether or not the transfer destination of the confidential workpiece is work station 500. For example, whether or not the transfer destination is work station 500 is determined based on the transfer command received in step S120. Processor 161 switches the control to step S162 when determining that the transfer destination of the confidential workpiece is work station 500 (YES in step S160). Otherwise (NO in step S160), processor 161 switches the control to step S170.

In step S162, processor 161 specifies work stations 500 set as the confidential area from confidential setting information 176 (see FIG. 14), and transfers the confidential workpiece to the unoccupied work station in specified work stations 500.

In step S164, processor 161 transmits an instruction to operating terminal 550 in work station 500 to restrict the displaying of the information about the confidential workpiece.

In step S170, processor 161 determines whether to end the transfer processing or not. As an example, a transfer processing end instruction is issued when a transfer end instruction is executed on the transfer program or when some error occurs. When determining that the transfer processing is ended (YES in step S170), processor 161 ends the processing in FIG. 17. Otherwise (NO in step S170), processor 161 returns the control to step S110.

M. Summary

As described above, when the workpiece of the transfer target is the confidential target, pallet transfer system 10 transfers the confidential workpiece by the special transfer method (that is, the confidential transfer). In the confidential transfer, the confidential workpiece is transferred to the predetermined confidential area. On the other hand, when the workpiece of the transfer target is the non-confidential target, pallet transfer system 10 transfers the non-confidential workpiece by the normal transfer method (that is, the non-confidential transfer).

In this way, pallet transfer system 10 changes the workpiece transfer method depending on whether or not the workpiece of the transfer target is the confidential target. As a result, the confidential information of the workpiece can be prevented from being leaked in the course of the workpiece transfer.

It should be considered that the disclosed embodiment is an example in all respects and not restrictive. The scope of the present invention is defined by not the description above, but the claims, and it is intended that all modifications within the meaning and scope of the claims are included in the present invention.

REFERENCE SIGNS LIST

10: pallet transfer system, 50: control device, 61, 62, 63: remote I/O unit, 71A, 71B, 71C, 71D: data area, 72: flame, 100: control system, 101, 161, 501: processor, 102, 162, 402, 502: ROM, 103, 163, 403, 503: RAM, 104, 164, 165, 504: communication interface, 105, 405, 505: display interface, 106, 430, 506: display, 107, 409, 507: input interface, 108, 431, 508: input device, 110, 510: bus, 120, 170, 420, 520: storage device, 122: pallet transfer program, 124: schedule information, 126, 176: confidential setting information, 130: confidential setting screen, 131, 132, 133, 134, 135: setting field, 136: OK button, 137: cancel button, 150: control panel, 151: PLC, 172, 522: control program, 200: pallet storage, 300: transfer device, 330: rail, 331: carriage, 333: fork part, 334, 411, 411A, 411B, 411C, 411D: servo driver, 335, 412, 412A, 412B, 412C, 412D: servomotor, 400, 400A, 400B: machine tool, 401: CNC, 404: field bus controller, 413A, 413B, 413C, 413D: encoder, 414A, 414B: ball screw, 415: main shaft, 422: machining program, 500A, 500B: work station, 524: worker information, 550: operation terminal

The invention claimed is:

1. A pallet transfer system comprising:
   a transfer device configured to transfer a pallet to which a workpiece is attachable;
   a pallet storage that is one of pallet transfer destination by the transfer device and configured to store a plurality of pallets;
   a work station that is one of the pallet transfer destinations by the transfer device, where a worker performs work of attaching the workpiece to the pallet transferred from the pallet storage;
   a plurality of machine tools that are one of the pallet transfer destinations by the transfer device and configured to machine the workpiece attached to the pallet at the work station; and
   a control device configured to control the transfer device,
   wherein the control device determines whether or not the workpiece to be machined is a confidential target based on information indicating whether or not the workpiece is a confidential target,
   the control device transfers the pallet to which the workpiece to be machined is attached by a first transfer method when determining that the workpiece to be machined is not the confidential target,
   the control device transfers the pallet to which the workpiece to be machined is attached by a second transfer method different from the first transfer method when determining that the workpiece to be machined is the confidential target, and
   the pallet to which the workpiece to be machined is attached is
   transferred from the pallet storage or the work station to an unoccupied machine tool in the plurality of machine tools in the first transfer method, and
   transferred from the pallet storage or the work station to a predetermined machine tool in the plurality of machine tools in the second transfer method.

2. The pallet transfer system according to claim 1, wherein in the second transfer method, the transfer of the pallet to which the workpiece of the confidential target is attached is prohibited in a predetermined time period.

3. The pallet transfer system according to claim 1, wherein the work station includes:
   a display that displays information about the workpiece to be machined; and
   a display control part that controls displaying of the display,
   the display control part permits displaying, on the display, information about the workpiece of the confidential target when the workpiece to be machined is a confidential target while predetermined first authority is given to the worker, and
   the display control part restricts the displaying of the information about the workpiece of the confidential target when the workpiece to be machined is a confidential target while second authority lower than the first authority is given to the worker.

4. A pallet transfer system comprising:
   a transfer device configured to transfer a pallet to which a workpiece is attachable;
   a pallet storage that is one of pallet transfer destinations by the transfer device and configured to store a plurality of pallets;
   a work station that is one of the pallet transfer destinations by the transfer device, where a worker performs work of attaching the workpiece to the pallet transferred from the pallet storage;
   a machine tool that is one of the pallet transfer destinations by the transfer device and configured to machine the workpiece attached to the pallet at the work station; and
   a control device configured to control the transfer device,
   wherein the control device determines whether or not the workpiece to be machined is a confidential target based on information indicating whether or not the workpiece is a confidential target,
   the control device transfers the pallet to which the workpiece to be machined is attached by a first transfer method when determining that the workpiece to be machined is not the confidential target,
   the control device transfers the pallet to which the workpiece to be machined is attached by a second transfer method different from the first transfer method when determining that the workpiece to be machined is the confidential target, and
   the pallet to which the workpiece to be machined is attached is
   transferred from the work station or the machine tool to an unoccupied location of the pallet storage in the first transfer method, and
   transferred from the work station or the machine tool to a predetermined location of the pallet storage in the second transfer method.

5. A pallet transfer system comprising:
   a transfer device configured to transfer a pallet to which a workpiece is attachable;
   a pallet storage that is one of pallet transfer destinations by the transfer device and configured to store a plurality of pallets;
   a plurality of work stations that are one of the pallet transfer destinations by the transfer device, where a worker performs work of attaching the workpiece to the pallet transferred from the pallet storage;
   a machine tool that is one of the pallet transfer destinations by the transfer device and configured to machine the workpiece attached to the pallet at the work station; and
   a control device configured to control the transfer device,
   wherein the control device determines whether or not the workpiece to be machined is a confidential target based on information indicating whether or not the workpiece is a confidential target,
   the control device transfers the pallet to which the workpiece to be machined is attached by a first transfer method when determining that the workpiece to be machined is not the confidential target,
   the control device transfers the pallet to which the workpiece to be machined is attached by a second transfer method different from the first transfer method when determining that the workpiece to be machined is the confidential target, and
   the pallet to which the workpiece to be machined is attached is
   transferred from the pallet storage or the machine tool to an unoccupied work station in the plurality of work stations in the first transfer method, and
   transferred from the pallet storage or the machine tool to a predetermined work station in the plurality of work stations in the second transfer method.

6. A pallet transfer method in a pallet transfer system, the pallet transfer system including:
   a transfer device configured to transfer a pallet to which a workpiece is attachable;
   a pallet storage that is one of pallet transfer destinations by the transfer device and configured to store a plurality of pallets;
   a work station that is one of the pallet transfer destinations by the transfer device, where a worker performs work of attaching the workpiece to the pallet transferred from the pallet storage; and
   a plurality of machine tools that are one of the pallet transfer destinations by the transfer device and configured to machine the workpiece attached to the pallet at the work station,
   the pallet transfer method comprising:
   determining whether or not the workpiece to be machined is a confidential target based on information indicating whether or not the workpiece is a confidential target;
   transferring the pallet to which the workpiece to be machined is attached by a first transfer method when determining that the workpiece to be machined is not the confidential target; and
   transferring the pallet to which the workpiece to be machined is attached by a second transfer method different from the first transfer method when determining that the workpiece to be machined is the confidential target,
   wherein the pallet to which the workpiece to be machined is attached is
   transferred from the pallet storage or the work station to an unoccupied machine tool in the plurality of machine tools in the first transfer method, and
   transferred from the pallet storage or the work station to a predetermined machine tool in the plurality of machine tools in the second transfer method.

7. A pallet transfer method in a pallet transfer system, the pallet transfer system including:
   a transfer device configured to transfer a pallet to which a workpiece is attachable;

a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage; and
a machine tool that is one of the pallet transfer destinations by the transfer device and configured to machine the workpiece attached to the pallet at the work station,
the pallet transfer method comprising:
determining whether or not the workpiece to be machined is a confidential target based on information indicating whether or not the workpiece is a confidential target;
transferring the pallet to which the workpiece to be machined is attached by a first transfer method when determining that the workpiece to be machined is not the confidential target; and
transferring the pallet to which the workpiece to be machined is attached by a second transfer method different from the first transfer method when determining that the workpiece to be machined is the confidential target,
wherein the pallet to which the workpiece to be machined is attached is
transferred from the work station or the machine tool to an unoccupied location of the pallet storage in the first transfer method, and
transferred from the work station or the machine tool to a predetermined location of the pallet storage in the second transfer method.

8. A pallet transfer method in a pallet transfer system, the pallet transfer system including:
a transfer device configured to transfer a pallet to which a workpiece is attachable;
a pallet storage that is one of pallet transfer destinations by the transfer device and configured to store a plurality of pallets;
a plurality of work stations that are one of the pallet transfer destinations by the transfer device, where a worker performs work of attaching the workpiece to the pallet transferred from the pallet storage; and
a machine tool that is one of the pallet transfer destinations by the transfer device and configured to machine the workpiece attached to the pallet at the work station,
the pallet transfer method comprising:
determining whether or not the workpiece to be machined is a confidential target based on information indicating whether or not the workpiece is a confidential target;
transferring the pallet to which the workpiece to be machined is attached by a first transfer method when determining that the workpiece to be machined is not the confidential target; and
transferring the pallet to which the workpiece to be machined is attached by a second transfer method different from the first transfer method when determining that the workpiece to be machined is the confidential target,
wherein the pallet to which the workpiece to be machined is attached is
transferred from the pallet storage or the machine tool to an unoccupied work station in the plurality of work stations in the first transfer method, and
transferred from the pallet storage or the machine tool to a predetermined work station in the plurality of work stations in the second transfer method.

9. A non-transitory computer readable storage medium storing a pallet transfer program executed by a pallet transfer system, wherein
the pallet transfer system includes:
a transfer device configured to transfer a pallet to which a workpiece is attachable;
a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage; and
a plurality of machine tools that are one of the pallet transfer destinations by the transfer device and configured to machine the workpiece attached to the pallet at the work station, and
the pallet transfer program causes the pallet transfer system to execute:
determining whether or not the workpiece to be machined is a confidential target based on information indicating whether or not the workpiece is a confidential target;
transferring the pallet to which the workpiece to be machined is attached by a first transfer method when determining that the workpiece to be machined is not the confidential target; and
transferring the pallet to which the workpiece to be machined is attached by a second transfer method different from the first transfer method when determining that the workpiece to be machined is the confidential target, and
the pallet to which the workpiece to be machined is attached is
transferred from the pallet storage or the work station to an unoccupied machine tool in the plurality of machine tools in the first transfer method, and
transferred from the pallet storage or the work station to a predetermined machine tool in the plurality of machine tools in the second transfer method.

10. A non-transitory computer readable storage medium storing a pallet transfer program executed by a pallet transfer system, wherein
the pallet transfer system includes:
a transfer device configured to transfer a pallet to which a workpiece is attachable;
a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage; and
a machine tool that is one of the pallet transfer destinations by the transfer device and configured to machine the workpiece attached to the pallet at the work station, and
the pallet transfer program causes the pallet transfer system to execute:
determining whether or not the workpiece to be machined is a confidential target based on information indicating whether or not the workpiece is a confidential target;
transferring the pallet to which the workpiece to be machined is attached by a first transfer method when determining that the workpiece to be machined is not the confidential target; and
transferring the pallet to which the workpiece to be machined is attached by a second transfer method different from the first transfer method when determining that the workpiece to be machined is the confidential target, and the pallet to which the workpiece to be machined is attached is transferred from the work station or the machine tool to an unoccupied location of the pallet storage in the first transfer method, and transferred from the work station or the machine tool to a predetermined location in of the pallet storage in the second transfer method.

11. A non-transitory computer readable storage medium storing a pallet transfer program executed by a pallet transfer system, wherein the pallet transfer system includes:

a transfer device configured to transfer a pallet to which a workpiece is attachable;

a pallet storage that is one of pallet transfer destinations by the transfer device and configured to store a plurality of pallets;

a plurality of work stations that are one of the pallet transfer destinations by the transfer device, where a worker performs work of attaching the workpiece to the pallet transferred from the pallet storage; and a machine tool that is one of the pallet transfer destinations by the transfer device and configured to machine the workpiece attached to the pallet at the work station, and the pallet transfer program causes the pallet transfer system to execute:

determining whether or not the workpiece to be machined is a confidential target based on information indicating whether or not the workpiece is a confidential target;

transferring the pallet to which the workpiece to be machined is attached by a first transfer method when determining that the workpiece to be machined is not the confidential target; and transferring the pallet to which the workpiece to be machined is attached by a second transfer method different from the first transfer method when determining that the workpiece to be machined is the confidential target, and the pallet to which the workpiece to be machined is attached is transferred from the pallet storage or the machine tool to an unoccupied work station in the plurality of work stations in the first transfer method, and transferred from the pallet storage or the machine tool to a predetermined work station in the plurality of work stations in the second transfer method.

* * * * *